United States Patent [19]

Mihara et al.

[11] Patent Number: 5,605,732
[45] Date of Patent: Feb. 25, 1997

[54] AMINIUM SALT COMPOUND AND OPTICAL RECORDING MEDIUM

[75] Inventors: Chieko Mihara, Isehara; Hiroyuki Sugata, Yamato; Tsuyoshi Santoh, Yokohama, all of Japan

[73] Assignee: Canon Kabushiki Kaisha, Tokyo, Japan

[21] Appl. No.: 997,882

[22] Filed: Dec. 29, 1992

[30] Foreign Application Priority Data

Jan. 6, 1992 [JP] Japan .................................. 4-000249

[51] Int. Cl.⁶ .................................................. B32B 3/00
[52] U.S. Cl. ................. 428/64.8; 428/913; 430/270.16; 430/945; 346/135.1; 347/264
[58] Field of Search ............................. 428/64, 65, 913; 430/270, 945; 346/76 C, 135.1

[56] References Cited

U.S. PATENT DOCUMENTS 3,251,881  5/1966  Susi et al. .
3,484,467  12/1969  Susi et al. .

(List continued on next page.)

FOREIGN PATENT DOCUMENTS 0305054  2/1988  European Pat. Off. .
264274  4/1988  European Pat. Off. .

(List continued on next page.)

OTHER PUBLICATIONS

Schrauzer et al., "Preparation, Reactions, and Structure of Bisdithio-α-diketone Complexes of Nickel, Palladium, and Platinum", 87 J. of Amer. Chem. Soc. 1415–2778 (1965).

Primary Examiner—Patrick J. Ryan
Assistant Examiner—Elizabeth Evans
Attorney, Agent, or Firm—Fitzpatrick, Cella, Harper & Scinto

[57] ABSTRACT

An aminium salt compound has the structure expressed by the following formula (I) or (II), and an optical recording layer has a recording layer containing the aminium salt compound.

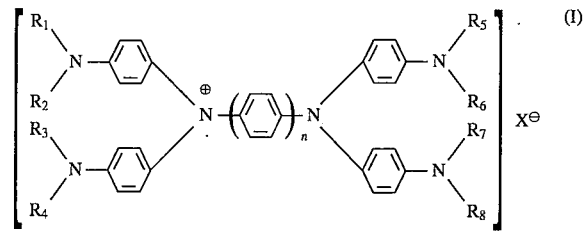

wherein $X^-$ indicates a monovalent metal complex anion; and $R_1$ through $R_8$ each indicate a hydrogen atom or a monovalent organic residue, and at least one of $R_1$ through $R_8$ is a monovalent organic residue selected from the group consisting of a substituted or unsubstituted alkoxyalkyl group, substituted or unsubstituted alkenyl group, substituted or unsubstituted alkynyl group and substituted or unsubstituted aralkyl group; and n is 1 or 2; and

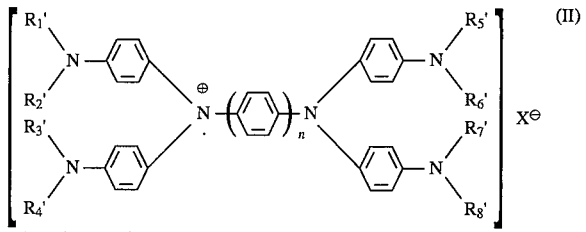

wherein $X^-$ indicates a monovalent metal complex anion; and $R_1'$ through $R_8'$ indicate the atoms that, when taken together in combination $R_m'$ and $R_{m+1}'$ (m=1, 3, 5 or 7) with a nitrogen atom N, at least one of such combinations forms a substituted or unsubstituted five-membered ring, substituted or unsubstituted six-membered ring or substituted or unsubstituted seven-membered ring; and n is 1 or 2.

38 Claims, 1 Drawing Sheet

U.S. PATENT DOCUMENTS

| | | |
|---|---|---|
| 3,575,871 | 4/1971 | Susi et al. . |
| 4,626,496 | 12/1986 | Sato . |
| 4,656,121 | 4/1987 | Sato et al. . |
| 4,923,390 | 5/1990 | Oguchi et al. . |
| 5,009,987 | 4/1991 | Mihara et al. . |
| 5,024,917 | 6/1991 | Mihara et al. . |
| 5,108,873 | 4/1992 | Fukui et al. . |

FOREIGN PATENT DOCUMENTS

| | | |
|---|---|---|
| 305054 | 3/1989 | European Pat. Off. . |
| 488231 | 6/1992 | European Pat. Off. . |
| 61-69991 | 4/1986 | Japan . |
| 62-193891 | 8/1987 | Japan . |
| 3-164292 | 7/1991 | Japan . |
| 2193659 | 3/1989 | United Kingdom . |

1

AMINIUM SALT COMPOUND AND OPTICAL RECORDING MEDIUM

BACKGROUND OF THE INVENTION

1. Field of the Invention

The present invention relates to an infrared absorbing compound and an optical recording medium using the compound and having excellent resistance to reproduction photo-deterioration and preservation stability.

2. Description of the Related Art

An optical recording medium such as an optical disk or the like has a substrate having spiral, circular or linear grooves. On the substrate is provided a recording layer, on which information can be recorded with high density by forming optically detectable small pits of, for example, the diameter off the pit is about 1 μm, therein.

For example, when a laser beam converging on the surface of the recording layer scans the recording layer, the recording layer absorbs laser energy to form optically detectable pits thereon so that information can be written thereon. For example, in a heat mode recording system, the recording layer absorbs heat energy to form concave pits at absorption positions due to evaporation, decomposition or the like, so that information is recorded thereon.

A metal thin film such as an aluminum deposited film or the like, a chalcogenide amorphous glass film such as a bismuth thin film, a tellurium oxide thin film, or a like film mainly consisting of an inorganic substance, has been proposed so far as the recording layer of such an optical recording medium. On the other hand, it has recently been proposed that an organic dye which exhibits changes in physical properties when exposed by light having a relatively long wavelength can be used in a recording layer.

For example, when a polymethine dye, an azulenium dye, a pyrylium dye or the like, which exhibits greater sensitivity to exposure by a laser beam, is used in an organic dye thin film, a light absorption reflecting a film exhibiting metallic luster (a reflectance of about 10 to 50%) is obtained. This film enables the formation of an optical recording medium which permits both laser recording and reflection reading. Particularly when a semiconductor laser having an oscillation wavelength of 650 to 900 nm is used as a laser light source with the film, the size and cost of the recording apparatus can both be reduced.

However, when an organic dye is used in recording layer, the organic dye tends to deteriorate after repeated irradiation with reproduction light, and the reproduction properties of the optical recording medium thereby also deteriorate. A known method for solving such a problem involves the use of a metal chelate complex (particularly, an Ni chelate complex) as a singlet oxygen quencher. However, a metal chelate complex cannot be added in an amount which is sufficient to improve the light-resistance of an organic dye, because the chelate complex has a low solubility in solvents which can be coated on a plastic substrate.

In another method, which is proposed in U.S. Pat. No. 4,626,496, a double salt is formed by a metal complex and a dye, so that a larger amount of metal complex can be added to the recording layer. Although the light resistance of the organic dye can be improved with this method, the density of the organic dye in the recording layer is also decreased, thereby decreasing the recording sensitivity. Alternatively, an aminium salt or a diimonium salt compound that serves as a stabilizer as disclosed in U.S. Pat. Nos. 4,656,121 and 4,923,390, can be added to the recording layer in order to improve the light resistance of an organic dye. The method of adding an aminium salt or diimonium salt to the recording layer has the problem, however, that a large amount of such a salt must be added to improve the light resistance because the counter ion is an acid anion. In order to solve this problem, an example is disclosed in Japanese Patent Laid-Open No. 62-193891, in which a small amount of a double salt complex of an aminium salt cation or diimonium salt cation and a metal complex anion is added to improve the light resistance.

Although this method can improve the light resistance and recording reproduction properties, when the aminium salt cation or diimonium salt cation is substituted by an alkyl amino group, the double salt compound with a metal complex anion lacks sufficient solubility in the usual solvents. In particular, such a compound has low solubility in solvents such as aliphatic hydrocarbons, alcohols, ketones and the like, which can be directly applied to a plastic substrate. There is also the problem that an optical recording medium having a recording layer formed by a solvent coating method frequently has a high noise level.

In addition, Japanese Patent Laid-Open No. 3-164292 discloses an optical disk with excellent light-resistance, which comprises (1) a recording layer consisting of a mixture of a diimonium salt cation and a metal complex anion and (2) a reflecting layer formed on the recording layer. Examples of diimonium salt cations disclosed in the specification of 3-164292 include a diimonium salt of N,N, N',N'-tetrakis (dialkylamino-substituted phenyl)-p-phenylenediamine, a diimonium salt of N,N,N'N'-tetrakis (dialkoxyalkylamino-substituted phenyl)-p-phenylenediamine, and the like. However, an organic dye recording layer containing such a double salt compound has insufficient preservation stability under conditions of high temperature and high humidity. Also the degree of improvement in light resistance of the recording layer is unsatisfactory.

SUMMARY OF THE INVENTION

The present invention has been achieved in view of the above problems with conventional recording mediums. An object of the present invention is to provide a novel aminium salt compound which has a large absorption peak in the infrared region and high solubility in an organic solvent that can be coated on a plastic substrate.

Another object of the present invention is to provide an optical recording medium that permits a significant improvement in the light resistance of an organic dye recording layer and that prevents deterioration of the recording density and preservation stability at high temperature and high humidity.

An aminium compound of the present invention is characterized by the structure expressed by the following formula (I):

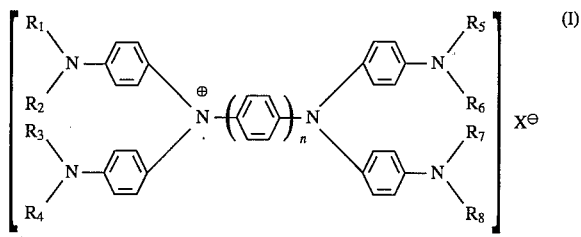

wherein $X^-$ indicates a monovalent metal complex anion; $R_1$ through $R_8$ each indicate a hydrogen atom or a monovalent organic residue, and at least one of $R_1$ through $R_8$ is a monovalent organic residue selected from the group consisting of substituted or unsubstituted alkoxyalkyl groups, substituted or unsubstituted alkenyl groups, substituted or unsubstituted alkynyl groups, and substituted and unsubstituted aralkyl groups; and n is 1 or 2.

In another embodiment, an optical recording medium of the present invention comprises a substrate and a recording layer, wherein the recording layer contains a compound expressed by the formula (I), as shown and described above.

In a further embodiment, an aminium salt compound of the present invention is characterized by the structure thereof expressed by the following formula (II):

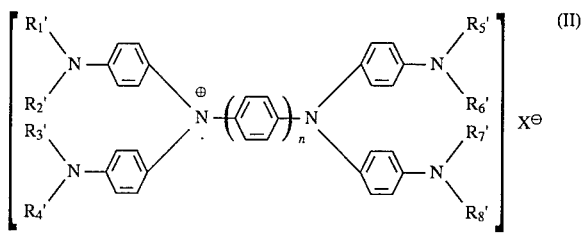

wherein $X^-$ represents a monovalent metal complex anion; $R_1'$ through $R_8'$ represent atom groups in combinations of $R_m'$ and $R_{m+1}'$ (m=1, 3, 5 or 7), at least one of which, together with the nitrogen N, forms a substituted or unsubstituted 5-membered ring, a substituted or unsubstituted 6-membered ring or a substituted or unsubstituted 7-membered ring; and n is 1 or 2.

In yet another embodiment, an optical recording medium of the present invention comprises a substrate and a recording layer, wherein the recording layer contains a compound expressed by formula (II), as shown and described above.

DETAILED DESCRIPTION OF THE INVENTION

Figure 1:
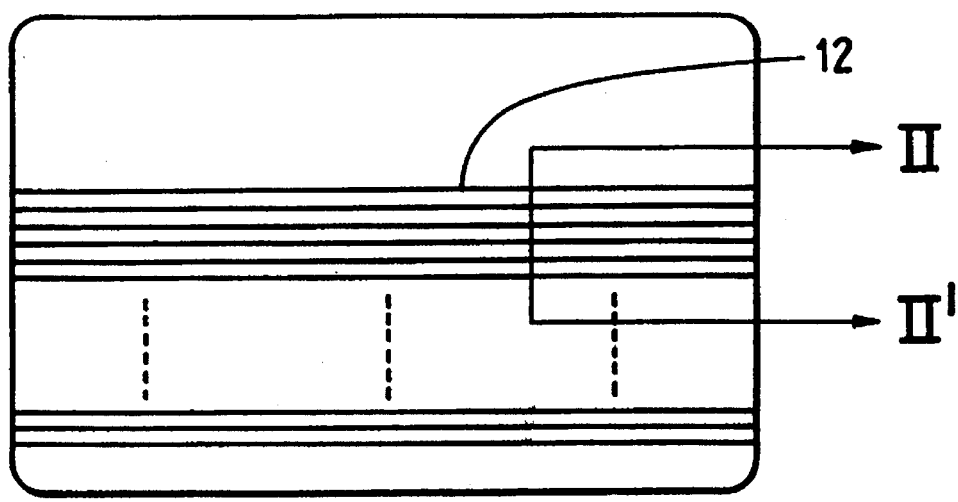
FIG. 1 is a schematic plan view of an optical card in accordance with the present invention.

The present invention is described in detail below. An aminium salt compound is expressed by the following formula (I):

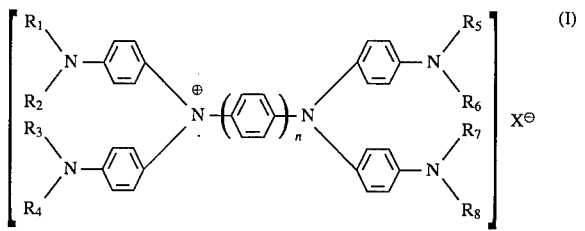

wherein $X^-$ is a metal complex anion, and $R_1$ through $R_8$ of the aminium salt cation each indicate a hydrogen atom or a monovalent organic residue. In the present invention, at least one of $R_1$ through $R_8$ is preferably a monovalent organic residue selected from the group consisting of a substituted or unsubstituted alkoxyalkyl group, substituted or unsubstituted alkenyl group, substituted or unsubstituted alkynyl group and substituted or unsubstituted aralkyl group. When at least one of $R_1$ through $R_8$ is a residue selected from the above groups, the aminium compound exhibits improved light-resistance and good solvent solubility, as compared with prior aminium compounds. In addition, when a recording layer contains the aminium compound of the invention, an optical recording medium having excellent light-resistance, stability for repeated reproduction, and good productivity can be obtained.

Examples of monovalent organic residues that are preferable as each of the groups $R_1$ through $R_8$ in the aminium salt compound expressed by the above formula (I) include alkoxyalkyl groups such as methoxymethyl, 2-methoxyethyl, 3-methoxypropyl, 2-methoxypropyl, 4-methoxybutyl, 3-methoxybutyl, 2-methoxybutyl, 5-methoxypentyl, 4-methoxypentyl, 3-methoxypentyl, 2-methoxypentyl, 6-methoxyhexyl, ethoxymethyl, 2-ethoxyethyl, 3-ethoxypropyl, 2-ethoxypropyl, 4-ethoxybutyl, 3-ethoxybutyl, 5-ethoxypentyl, ethoxypentyl, 6-ethoxypentyl, propoxymethyl, 2-propoxyethyl, 3-propoxypropyl, 4-propoxybutyl, 5-propoxypentyl groups and the like; substituted alkoxyalkyl groups such as cyclomethoxymethyl, 2-difluoromethoxyethyl groups; alkenyl groups such as vinyl, propenyl, butenyl, pentenyl, hexenyl, heptenyl, octenyl groups and the like; substituted alkenyl groups such as 1,2-dichlorovinyl, 2,3-dibromopropenyl groups and the like; alkynyl groups such as propargyl, butynyl, pentynyl, hexynyl groups and the like; substituted alkynyl groups such as 2,3-dichloropropargyl and the like; aralkyl groups such as benzyl, phenetyl, α-naphthylmethyl, β-naphthylmethyl groups and the like; substituted aralkyl groups such as carboxybenzyl, sulfobenzyl, p-methylbenzyl groups and the like.

Each of the monovalent organic residues $R_1$ through $R_8$ may be an alkyl group such as a methyl, ethyl, n-propyl, isopropyl, n-butyl, isobutyl, t-butyl, n-amyl, t-amyl, n-hexyl, n-octyl, t-octyl group or the like; a substituted alkyl group such as a 2-hydroxyethyl 3-hydroxypropyl group or the like. However, at least one of $R_1$ through $R_8$, and preferably at least two of the combinations of the organic residues $R_1$ and $R_2$, $R_3$ and $R_4$, $R_5$ and $R_6$, and $R_7$ and $R_8$, are monovalent organic residues selected from the group consisting of substituted or unsubstituted alkoxyalkyl, substituted or unsubstituted alkenyl, substituted or unsubstituted alkynyl and substituted or unsubstituted aralkyl groups. It is also preferable, to improve the preservation stability at high temperature and high humidity of the recording layer of the optical recording medium containing the aminium salt compound of the present invention, that all the organic residues $R_1$ through $R_8$ are selected from the group consisting of substituted or unsubstituted alkoxyalkyl, substituted or unsubstituted alkenyl, substituted or unsubstituted alkynyl and substituted or unsubstituted aralkyl groups. A substituted or unsubstituted alkoxyalkyl group is especially preferred to further improve the solvent solubility of the double salt compound. In the present invention, each of the organic residues $R_1$ through $R_8$ preferably has 2 to 8 carbon atoms, more preferably 3 to 8 carbon atoms.

Alternatively, an aminium salt compound of the present invention has a structure expressed by the following formula (II):

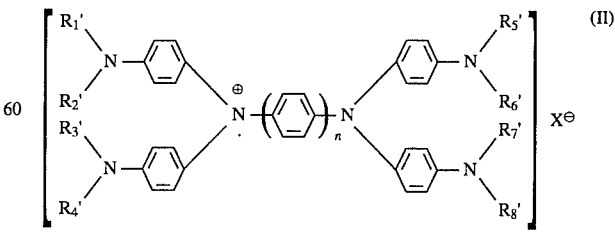

wherein $X^-$ indicates a metal complex anion, and $R_1'$ through $R_8'$ in the above aminium salt cation indicate atoms that, when taken together in combinations of $R_1'$ and $R_2'$, $R_3'$ and $R_4'$, $R_5'$ and $R_6'$, and $R_7'$ and $R_8'$, with a nitrogen atom N, at least one of such combinations forms a substituted or unsubstituted 5-membered ring, a substituted or unsubstituted 6-membered ring or a substituted or unsubstituted 7-membered ring. In the present invention, examples of useful 5-membered rings include a pyrrolidine ring and the like; examples of useful 6-membered rings include a piperidine ring, a morpholine ring, and a tetrahydropyridine ring and the like; and examples of useful 7-membered rings include a cyclohexylamine ring and the like. Further, when each of the combinations $R_m'$ and $R_{m+1}'$ (m=1, 3, 5, or 7) comprises atom groups which form a morpholine ring, the solvent solubility of the double salt compound of the invention can be desirably even more improved.

It is especially preferred that at least two of the combinations $R_1'$ and $R_2'$, $R_3'$ and $R_4'$, $R_5'$ and $R_6'$, and $R_7'$ and $R_8'$ in the formula (II) form substituted or unsubstituted 5-membered, substituted or unsubstituted 6-membered or substituted or unsubstituted 7-membered rings. It is even more preferred that all combinations $R_m'$ and $R_{m+1}'$ (m=1, 3, 5, or 7) form substituted or unsubstituted 5-membered, substituted or unsubstituted 6-membered or substituted or unsubstituted 7-membered rings.

In addition, all aromatic rings in a compound expressed by the formula (I) may be substituted by a lower alkyl group having 1 to 5 carbon atoms, a lower alkoxy group having 1 to 5 carbon atoms, a halogen atom, a hydroxyl group, a cyano group or the like. Finally, "n" in the formulas (I) and (II) is either 1 or 2.

Examples of aminium salt cations used in an infrared absorbing compound of the present invention expressed by the formula (I) or (II) are shown in Table 1-1 and 1-2. In the tables, for the sake of simplicity, for example, when n=1, $R_2$ to $R_4$ are each an ethyl group, and $R_5$ to $R_8$ are each a propenyl group, an aminium salt cation expressed by the formula (I) is shown as below.

| ⟨⟨⟩⟩$_n$ | $R_1$ | $R_2$ | $R_3$ | $R_4$ | $R_5$ | $R_6$ | $R_7$ | $R_8$ |
|---|---|---|---|---|---|---|---|---|
| ⟨⟩ | $C_2H_5$ | $C_2H_5$ | $C_2H_5$ | $C_2H_5$ | $CH_2=CHCH_2$ | $CH_2CH=CH_2$ | $CH_2=CHCH_2$ | $CH_2=CHCH_2$ |

In addition, when n=2, and each of the combinations $R_1'$ and $R_2'$, $R_3'$ and $R_4'$, $R_5'$ and $R_6'$ and $R_7'$ and $R_8'$ forms a 5-membered ring, the aminium salt cation in the formula (II) is shown as below.

| ⟨⟨⟩⟩$_n$ | $R_1'$ | $R_2'$ | $R_3'$ | $R_4'$ | $R_5'$ | $R_6'$ | $R_7'$ | $R_8'$ |
|---|---|---|---|---|---|---|---|---|
| ⟨⟩⟨⟩ | | $CH_2CH_2CH_2CH_2$ | | $CH_2CH_2CH_2CH_2$ | | $CH_2CH_2CH_2CH_2$ | | $CH_2CH_2CH_2CH_2$ |

TABLE I-I

| No. | $\displaystyle\left(\bigcirc\right)_n$ | $R_1$ | $R_2$ | $R_3$ | $R_4$ | $R_5$ | $R_6$ | $R_7$ | $R_8$ |
|---|---|---|---|---|---|---|---|---|---|
| 101 | 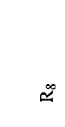 | $CH_2CH=CH_2$ | $CH_2CH=CH_2$ | $CH_2CH=CH_2$ | $CH_2CH=CH_2$ | $CH_2CH=CH_2$ | $CH_2CH=CH_2$ | $CH_2CH=CH_2$ | $CH_2CH=CH_2$ |
| 102 | 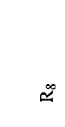 | $C_2H_4OCH_3$ | $C_2H_4OCH_3$ | $C_2H_4OCH_3$ | $C_2H_4OCH_3$ | $C_2H_4OCH_3$ | $C_2H_4OCH_3$ | $C_2H_4OCH_3$ | $C_2H_4OCH_3$ |
| 103 | 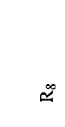 | $C_3H_6OC_3H_7$ | $C_3H_6OC_3H_7$ | $C_3H_6OC_3H_7$ | $C_3H_6OC_3H_7$ | $C_3H_6OC_3H_7$ | $C_3H_6OC_3H_7$ | $C_3H_6OC_3H_7$ | $C_3H_6OC_3H_7$ |
| 104 | 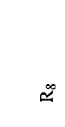 | $CH_2CH=CH_2$ | $CH_2CH=CH_2$ | $CH_2CH=CH_2$ | $CH_2CH=CH_2$ | $CH_2CH=CH_2$ | $CH_2CH=CH_2$ | $CH_2CH=CH_2$ | $CH_2CH=CH_2$ |
| 105 | 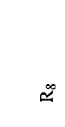 | $C_2H_4CH=CH_2$ | $C_2H_4CH=CH_2$ | $C_2H_4CH=CH_2$ | $C_2H_4CH=CH_2$ | $C_2H_4CH=CH_2$ | $C_2H_4CH=CH_2$ | $C_2H_4CH=CH_2$ | $C_2H_4CH=CH_2$ |
| 106 | 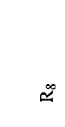 | $C_2H_4OC_2H_5$ | $C_2H_4OC_2H_5$ | $C_2H_4OC_2H_5$ | $C_2H_4OC_2H_5$ | $C_2H_4OC_2H_5$ | $C_2H_4OC_2H_5$ | $C_2H_4OC_2H_5$ | $C_2H_4OC_2H_5$ |
| 107 | 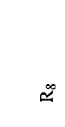 | $C_2H_4C\equiv CH$ | $C_2H_4C\equiv CH$ | $C_2H_4C\equiv CH$ | $C_2H_4C\equiv CH$ | $C_2H_4C\equiv CH$ | $C_2H_4C\equiv CH$ | $C_2H_4C\equiv CH$ | $C_2H_4C\equiv CH$ |
| 108 | 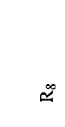 | $C_2H_4OCH_3$ | $C_2H_4OCH_3$ | $C_2H_4OCH_3$ | $C_2H_4OCH_3$ | $C_2H_4OCH_3$ | $C_2H_4OCH_3$ | $C_2H_4OCH_3$ | $C_2H_4OCH_3$ |
| 109 | 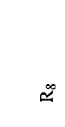 | $C_2H_4CH=CH_2$ | $C_2H_4CH=CH_2$ | $C_2H_4CH=CH_2$ | $C_2H_4CH=CH_2$ | $C_2H_4CH=CH_2$ | $C_2H_4CH=CH_2$ | $C_2H_4CH=CH_2$ | $C_2H_4CH=CH_2$ |
| 110 | 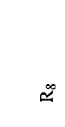 | $C_2H_4OCH_3$ | $C_2H_4OCH_3$ | $C_2H_4OCH_3$ | $C_2H_4OCH_3$ | $C_3H_7$ | $C_3H_7$ | $C_3H_7$ | $C_3H_7$ |
| 111 | 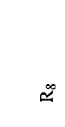 | $C_2H_4OC_2H_5$ | $C_2H_4OC_2H_5$ | $C_2H_5$ | $C_2H_5$ | $C_2H_4OC_2H_5$ | $C_2H_4OC_2H_5$ | $C_2H_5$ | $C_2H_5$ |
| 112 | 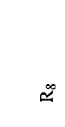 | $C_2H_4C\equiv CH$ | $C_2H_4C\equiv CH$ | $C_2H_4C\equiv CH$ | $C_2H_4C\equiv CH$ | $C_2H_4C\equiv CH$ | $C_2H_4C\equiv CH$ | $C_2H_4C\equiv CH$ | $C_2H_4C\equiv CH$ |
| 113 | 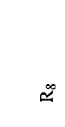 | $C_2H_4OCH_3$ | $C_2H_4OCH_3$ | $C_2H_4OCH_3$ | $C_2H_4OCH_3$ | $C_2H_4OCH_3$ | $C_2H_4OCH_3$ | $C_2H_4OCH_3$ | $C_2H_4OCH_3$ |

TABLE I-I-continued
| No. | $\left(\bigcirc\right)_n$ | $R_1$ | $R_2$ | $R_3$ | $R_4$ | $R_5$ | $R_6$ | $R_7$ | $R_8$ |
|---|---|---|---|---|---|---|---|---|---|
| 114 |  | $CH_2OC_2H_5$ | $CH_2OC_2H_5$ | $CH_2OC_2H_5$ | $CH_2OC_2H_5$ | $CH_2OC_2H_5$ | $CH_2OC_2H_5$ | $CH_2OC_2H_5$ | $CH_2OC_2H_5$ |
| 115 | 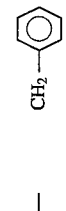 | $CH_2$— | $CH_2$— | $CH_2$— | $CH_2$— | $CH_2$— | $CH_2$— | $CH_2$— | $CH_2$— |
| 116 |  | $CH_2$——$CH_3$ | $CH_2$——$CH_3$ | $CH_2$——$CH_3$ | $CH_2$——$CH_3$ | $CH_2$——$CH_3$ | $CH_2$——$CH_3$ | $CH_2$——$CH_3$ | $CH_2$——$CH_3$ |

TABLE 1-2

| No. | ⟨⟨◯⟩⟩ₙ | $R_1'$ | $R_2'$ | $R_3'$ | $R_4'$ | $R_5'$ | $R_6'$ | $R_7'$ | $R_8'$ |
|---|---|---|---|---|---|---|---|---|---|
| 201 | —⟨◯⟩— | $CH_2CH_2CH_2CH_2$ | | $CH_2CH_2CH_2CH_2$ | | $CH_2CH_2CH_2CH_2$ | | $CH_2CH_2CH_2CH_2$ | |
| 202 | —⟨◯⟩—⟨◯⟩— | $CH_2CH_2CH_2CH_2CH_2$ | | $CH_2CH_2CH_2CH_2CH_2$ | | $CH_2CH_2CH_2CH_2CH_2$ | | $CH_2CH_2CH_2CH_2CH_2$ | |
| 203 | —⟨◯⟩— | $\underset{CHCH_2CH_2CH_2}{\overset{CH_3}{\mid}}$ | | $\underset{CHCH_2CH_2CH_2}{\overset{CH_3}{\mid}}$ | | $\underset{CHCH_2CH_2CH_2}{\overset{CH_3}{\mid}}$ | | $\underset{CHCH_2CH_2CH_2}{\overset{CH_3}{\mid}}$ | |
| 204 | —⟨◯⟩— | $\underset{CH=C-CH_2CCH_2}{\overset{CH_3\ (CH_3)_2}{\mid\ \ \ \ \mid}}$ | | $\underset{CH=CCH_2CCH_2}{\overset{CH_3\ (CH_3)_2}{\mid\ \ \ \ \mid}}$ | | $\underset{CH=CCH_2CCH_2}{\overset{CH_3\ (CH_3)_2}{\mid\ \ \ \ \mid}}$ | | $\underset{CH=CCH_2CCH_2}{\overset{CH_3\ (CH_3)_2}{\mid\ \ \ \ \mid}}$ | |
| 205 | —⟨◯⟩— | $\underset{CHCH_2CH_2CH}{\overset{CH_3\ \ \ \ CH_3}{\mid\ \ \ \ \ \ \mid}}$ | | $\underset{CHCH_2CH_2CH}{\overset{CH_3\ \ \ \ CH_3}{\mid\ \ \ \ \ \ \mid}}$ | | $\underset{CHCH_2CH_2CH}{\overset{CH_3\ \ \ \ CH_3}{\mid\ \ \ \ \ \ \mid}}$ | | $\underset{CHCH_2CH_2CH}{\overset{CH_3\ \ \ \ CH_3}{\mid\ \ \ \ \ \ \mid}}$ | |
| 206 | —⟨◯⟩— | $CH_2CH_2OCH_2CH_2$ | | $CH_2CH_2OCH_2CH_2$ | | $CH_2CH_2OCH_2CH_2$ | | $CH_2CH_2OCH_2CH_2$ | |
| 207 | —⟨◯⟩— (Cl) | $\underset{CHCH_2CH_2CH_2CH_2CH_2}{\overset{CH_3}{\mid}}$ | | $\underset{CHCH_2CH_2CH_2CH_2CH_2}{\overset{CH_3}{\mid}}$ | | $\underset{CHCH_2CH_2CH_2CH_2CH_2}{\overset{CH_3}{\mid}}$ | | $\underset{CHCH_2CH_2CH_2CH_2CH_2}{\overset{CH_3}{\mid}}$ | |
| 208 | —⟨◯⟩—⟨◯⟩— | $CH_2CH_2OCH_2CH_2$ | $n$-$C_4H_9$ | $n$-$C_4H_9$ | | $CH_2CH_2OCH_2CH_2$ | $n$-$C_4H_9$ | $n$-$C_4H_9$ | |

A description will now be made of the metal complex anion $X^-$, which accompanies the aminium salt cation.

In the present invention, various metal complex compounds can be used as the counter anion. Examples of such metal complex anions include the anions represented by the following formulas (II) through (IX), wherein M is a transition metal atom such as Ni, Co, Mn, Cu, Pb, Pt or the like.

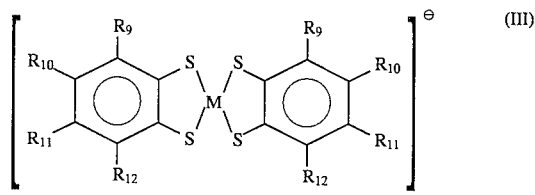
(III)

wherein $R_9$ through $R_{12}$ each indicate a hydrogen atom, a substituted or unsubstituted alkyl group, substituted or unsubstituted amino or substituted or unsubstituted alkoxy group, or a halogen atom.

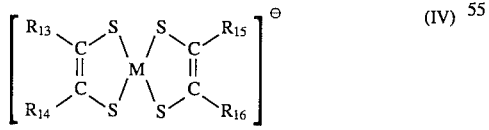
(IV)

wherein $R_{13}$ through $R_{16}$ each indicate a substituted or unsubstituted alkyl group or a substituted or unsubstituted aryl group or a cyano group.

In a particularly preferred embodiment, at least one of $R_{13}$ through $R_{14}$ of the formula (IV) is an alkoxy-substituted aryl group, such as shown below in the following structure:

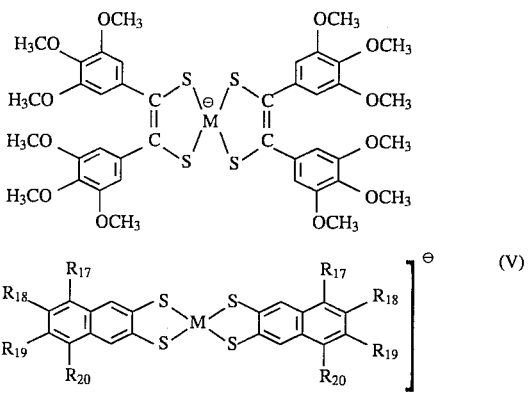

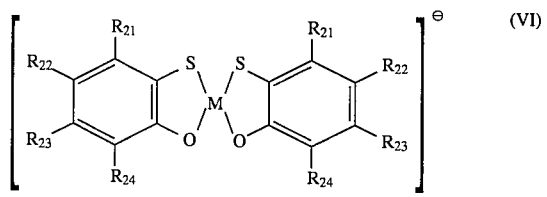
(V)

wherein $R_{17}$ through $R_{20}$ each indicate a hydrogen atom, a substituted or unsubstituted alkyl group, a substituted or unsubstituted amino group, a substituted or unsubstituted aryl, a substituted or unsubstituted alkoxy group, or a halogen atom.

(VI)

wherein $R_{21}$ through $R_{24}$ each indicate a hydrogen atom, a substituted or unsubstituted alkyl group, a substituted or unsubstituted amino group, a substituted or unsubstituted aryl group, a substituted or unsubstituted alkoxy group, or a halogen atom.

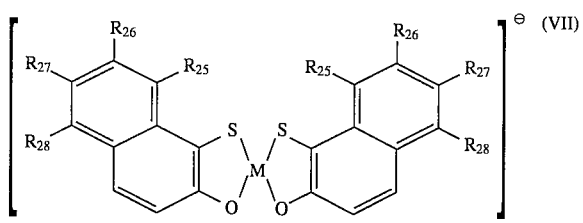

wherein $R_{25}$ through $R_{28}$ each indicate a hydrogen atom, a substituted or unsubstituted alkyl group, a substituted or unsubstituted amino group, a substituted or unsubstituted aryl group, a substituted or unsubstituted alkoxy group, or a halogen atom.

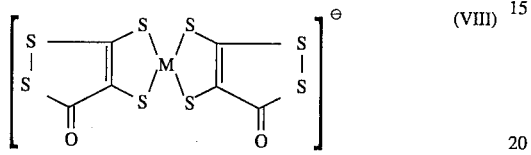

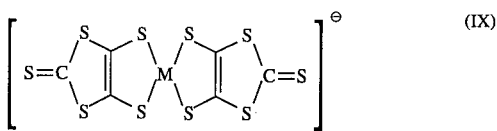

Examples of substituted or unsubstituted alkyl groups represented by $R_9$ through $R_{28}$ in the formulae (III) through (VII) include methyl, ethyl, n-propyl, isopropyl, n-butyl, sec-butyl, isobutyl, t-butyl, n-amyl, t-amyl, n-hexyl, n-octyl, t-octyl groups and the like. Examples of substituted or unsubstituted alkoxy groups include methoxy, ethoxy, n-propyloxy, isopropyloxy groups and the like.

Examples of substituted amino groups represented by $R_9$ through $R_{12}$, $R_{17}$ through $R_{20}$, $R_{21}$ through $R_{24}$, and $R_{25}$ through $R_{28}$ include dimethylamino, diethylamino, dipropylamino, acetylamino, benzoylamino groups and the like.

Examples of substituted or unsubstituted aryl groups shown by $R_{13}$ through $R_{16}$, $R_{17}$ through $R_{20}$, $R_{21}$ through $R_{24}$, and $R_{25}$ through $R_{28}$ include phenyl, tolyl, xylyl, ethylphenyl, chlorophenyl, nitrophenyl, methoxyphenyl, dimethoxyphenyl, trimethoxyphenyl, ethoxyphenyl groups and the like.

Examples of metal complex anions used in the present invention are shown in Tables 2-1 to 2-6.

TABLE 2-1

| Metal complex | | | | | | |
|---|---|---|---|---|---|---|
| Formula | No. | M | $R_9$ | $R_{10}$ | $R_{11}$ | $R_{12}$ |
| (III) | 1 | Ni | H | CH₃ | H | H |
|  | 2 | Ni | H | N(CH₃)₂ | H | H |
|  | 3 | Zn | H | CH₃ | H | H |
|  | 4 | Ni | H | H | H | H |
|  | 5 | Ni | Cl | Cl | H | Cl |
|  | 6 | Pd | H | H | H | H |
|  | 7 | Ni | H | N(CH₃)₂ | CH₃ | H |
|  | 8 | Ni | H | N(C₂H₅)₂ | H | H |
|  | 9 | Ni | H | OCH₃ | H | H |
|  | 10 | Cu | Cl | Cl | H | Cl |

In a particularly preferred embodiment, the metal complex anion has the following structure:

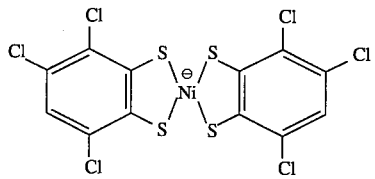

TABLE 2-2

| Metal complex | | | | | | |
|---|---|---|---|---|---|---|
| Formula | No. | M | $R_{13}$ | $R_{14}$ | $R_{15}$ | $R_{16}$ |
| (IV) | 1 | Ni | —⟨phenyl⟩ | —⟨phenyl⟩ | —⟨phenyl⟩ | —⟨phenyl⟩ |
|  | 2 | Ni | —⟨phenyl⟩—N(CH₃)₂ | —⟨phenyl⟩ | —⟨phenyl⟩—N(CH₃)₂ | —⟨phenyl⟩ |
|  | 3 | Ni | —⟨phenyl⟩—N(C₂H₅)₂ | —⟨phenyl⟩ | —⟨phenyl⟩—N(C₂H₅)₂ | —⟨phenyl⟩ |
|  | 4 | Ni | —⟨phenyl⟩—OCH₃ | —⟨phenyl⟩—OCH₃ | —⟨phenyl⟩—OCH₃ | —⟨phenyl⟩—OCH₃ |

TABLE 2-2-continued

| Metal complex Formula | No. | M | $R_{13}$ | $R_{14}$ | $R_{15}$ | $R_{16}$ |
|---|---|---|---|---|---|---|
| | 5 | Ni | 2,3,4-trimethoxyphenyl | 2,3,4-trimethoxyphenyl | 2,3,4-trimethoxyphenyl | 2,3,4-trimethoxyphenyl |
| | 6 | Ni | 3,5-dichlorophenyl | 3,5-dichlorophenyl | 3,5-dichlorophenyl | 3,5-dichlorophenyl |
| | 7 | Pt | 4-N(C$_2$H$_5$)$_2$-phenyl | phenyl | 4-N(C$_2$H$_5$)$_2$-phenyl | phenyl |
| | 8 | Ni | 2,3,4-tri(CF$_3$)phenyl | 2,3,4-tri(CF$_3$)phenyl | 2,3,4-tri(CF$_3$)phenyl | 2,3,4-tri(CF$_3$)phenyl |
| | 9 | Cu | phenyl | phenyl | phenyl | phenyl |
| | 10 | Ni | CH$_3$ | CH$_3$ | CH$_3$ | CH$_3$ |

TABLE 2-3

| Metal complex Formula | No. | M | $R_{17}$ | $R_{18}$ | $R_{19}$ | $R_{20}$ |
|---|---|---|---|---|---|---|
| (V) | 1 | Ni | H | H | H | H |
| | 2 | Ni | H | Cl | Cl | H |
| | 3 | Ni | H | CH$_3$ | H | H |
| | 4 | Pt | H | H | H | H |
| | 5 | Ni | H | benzyl (–C$_6$H$_4$–CH$_3$) | benzyl (–C$_6$H$_4$–CH$_3$) | H |
| | 6 | Ni | H | N(CH$_3$)$_2$ | N(CH$_3$)$_2$ | H |

TABLE 2-4

| Metal complex Formula | No. | M | $R_{21}$ | $R_{22}$ | $R_{23}$ | $R_{24}$ |
|---|---|---|---|---|---|---|
| (VI) | 1 | Ni | H | H | H | H |
| | 2 | Ni | H | CH$_3$ | H | H |
| | 3 | Ni | Cl | Cl | H | Cl |
| | 4 | Ni | H | N(CH$_3$)$_2$ | CH$_3$ | H |
| | 5 | Ni | H | phenyl | 4-methylphenyl | H |

TABLE 2-5

| Metal complex Formula | No. | M | $R_{25}$ | $R_{26}$ | $R_{27}$ | $R_{28}$ |
|---|---|---|---|---|---|---|
| (VII) | 1 | Ni | N | H | H | H |
| | 2 | Ni | H | OCH$_3$ | H | H |
| | 3 | Ni | H | N(CH$_2$)$_2$ | H | H |
| | 4 | Co | H | Cl | Cl | H |
| | 5 | Ni | H | C$_2$H$_5$ | H | H |
| | 6 | Ni | H | H | H | H |

TABLE 2-6

| Formula | No. | M |
|---|---|---|
| (VIII) | 1 | Ni |
|  | 2 | Co |
|  | 3 | Cu |
|  | 4 | Mn |
| (IX) | 1 | Ni |
|  | 2 | Pt |
|  | 3 | Pb |
|  | 4 | Cu |

A compound expressed by the formula (I) or (II) of the present invention is a double salt compound in which the aminium salt cation and the metal complex compound forms a salt. Examples of such double salt compounds are shown in Table 3-1 and 3-2.

TABLE 3-1

| Double salt compound No. | Aminium salt compound cation No. | Metal complex anion No. |
|---|---|---|
| (I)- 1 | 102 | (IV)-5 |
| 2 | 106 | (IV)-5 |
| 3 | 102 | (IV)-2 |
| 4 | 102 | (IV)-1 |
| 5 | 113 | (VII)-3 |
| 6 | 107 | (VIII)-1 |
| 7 | 108 | (IV)-4 |
| 8 | 102 | (III)-5 |
| 9 | 114 | (IV)-2 |
| 10 | 102 | (IV)-5 |
| 11 | 111 | (III)-10 |
| 12 | 105 | (IV)-1 |
| 13 | 115 | (VI)-3 |
| 14 | 103 | (IX)-1 |
| 15 | 101 | (III)-5 |

TABLE 3-2

| Double salt compound No. | Aminium salt coopound cation No. | Metal complex anion No. |
|---|---|---|
| (II)- 1 | 205 | (V)-3 |
| 2 | 206 | (III)-10 |
| 3 | 204 | (IV)-8 |
| 4 | 203 | (IV)-5 |
| 5 | 206 | (IV)-4 |
| 6 | 206 | (III)-5 |
| 7 | 207 | (VI)-1 |
| 8 | 201 | (VII)-2 |
| 9 | 202 | (IX)-2 |
| 10 | 208 | (IV)-3 |

In the present invention, a double salt compound having a metal complex compound anion in which at least one of $R_{13}$ through $R_{16}$ is an alkoxy-substituted aryl group, or a double salt compound in which at least one of $R_9$ through $R_{12}$ is a halogen atom, typically exhibits excellent solvent solubility. When such a double salt compound is incorporated in a recording layer together with an organic dye, the light resistance of the recording layer is improved without causing deterioration of preservation stability, thereby effectively preventing the deterioration of the recording layer due to exposure to reproduction light. In the present invention, the double salt compound having a metal complex anion shown by the formula (III) or (IV) is thus preferred. A double salt compound having the metal complex anion (III)-5 shown in Table 2-1 or the metal complex anion (IV)-5 shown in Table 2-2 is even more preferred.

A description will now be made of the method of synthesizing the compound shown by the formula (I) or (II) of the present invention.

First, an aminium salt compound having as a counter ion an acid anion (for example, perchlorate ion, iodine ion, chlorine ion, hexafluoroantimonate ion or the like) is synthesized. This aminium salt compound can be obtained by employing the method disclosed in U.S. Pat. Nos. 3,251,881, 3,575,871 and 3,484,467 and Japanese Patent Laid-Open No. 61-69991. For example, the compound can be synthesized by the following method, which comprises an Ullmann reaction followed by a reduction reaction:

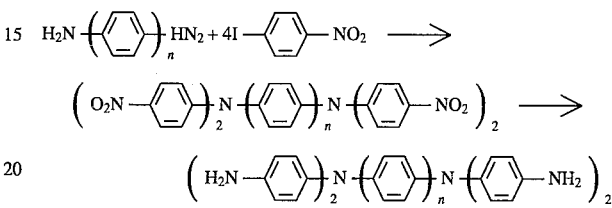

The amino compound obtained by the above Ullmann reaction and reduction reaction is then selectively substituted by an alkoxy, alkyl, alkenyl, aralkyl or alkynyl group and oxidized to obtain an aminium cation of an aminium salt compound expressed by the formula (I).

When the groups $R_1$ through $R_8$ are unsymmetrical, the selective substitution must be effected in a multi-step manner. It is thus preferred from the viewpoint of cost that the groups $R_1$ through $R_8$ be the same.

An aminium salt cation of an aminium salt compound expressed by the formula (II) may be synthesized by using an appropriate alkylating agent suitable for $R_m'$ and $R_{m+1}'$ (m=1, 3, 5 or 7) to form, together with nitrogen N, a substituted or unsubstituted 5-membered, substituted or unsubstituted 6-membered or substituted or unsubstituted 7-membered ring during the step of selective substitution, as shown above for the formula (I).

For example, a pyrrolidine ring can be formed by alkylation using 1,4-dibromobutane, 1,4-dichlorobutane, 1,4-diiodobutane or the like, and a piperidine ring can be formed using 1,5-dibromopentane, 1,5-dichloropentane, 1,5-diiodopentane or the like. A morpholine ring can be formed by hydroxyethylation using 2-bromoethanol, followed by an acid treatment for dehydration. A tetrahydropyridine ring can be formed by methacrylation using methacryl bromide, followed by an acid treatment. A cyclohexylamine ring can be formed by 1,6-dibromohexane.

In particular, the cyclization of an amino group proceeds rapidly and at a high yield, as compared with alkylation, and is thus remarkably advantageous for production as compared with the conventional cyclization of a propyl or butyl group.

On the other hand, an anion-type metal complex which accompanies the cation as a counter ion can be obtained, for example, in accordance with the method of Schrauzer et al. as described in the Journal of American Chemical Society, Vol. 87, 1483, 1965. Specifically, such a metal complex can be synthesized in accordance with either of the following two processes:

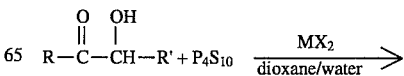

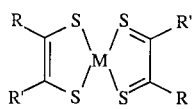

where R and R' each represent an alkyl group, an aromatic ring or the like; X is a halogen atom; and M is a transition metal; and

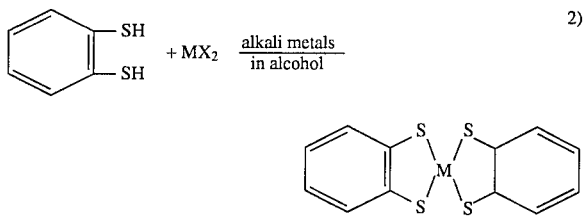

The neutral metal complex obtained by the reaction 1) or 2) is changed to an anion in dimethylsulfoxide to which p-phenylenediamine has been added, and is then changed to a metal complex anion in an alcohol to which a quaternary alkyl ammonium salt has been added. In this case, a tetraalkylammonium such as $N^+(CH_3)_4$, $N^+(C_4H_9)_4$, or the like, is particularly preferred as the cation.

Equal molar amounts of the aminium salt compound and the anion-type metal complex are then dissolved in a polar solvent. N,N-dimethylformamide or the like is preferred as the polar solvent, and the concentration is preferably about 0.01 mol/l.

Double decomposition is then produced by adding an aqueous solvent, preferably water, to the resulting solution until a precipitate is obtained. The molar amount of water added may be in considerable excess of the molar amounts of the reactants, preferably at least 10 times.

The reaction temperature is preferably room temperature to about 90° C. The resulting from above precipitate is then followed by filtration and drying. For purpose of purification of the precipitate, a treatment, that is, dissolved the obtained precipitate in a polar solvent and add an aqueous solvent to the polar solvent to obtain the precipitate may be perform repeatedly, and the precipitates are then recrystallized by DMF-methanol or the like to obtain the double salt compound of the present invention.

The double salt compound of the present invention can also be obtained by another method in which a neutral intermediate of a metal complex anion is dissolved in methylene chloride or the like. An equal molar amount of an aminium salt compound that is bonded to an acid anion is added to the resulting solution, followed by concentration and recrystallization. The double salt compound may also be formed by yet another method in which the neutral intermediate of a metal complex anion is dissolved in methylene chloride or the like. An equal molar amount of an aminium salt compound is added to the resulting solution, followed by concentration and recrystallization.

The resulting double salt compounds, each having an aminium salt cation and a metal complex anion, have a maximum absorption wavelength of 900 nm or more and an absorption coefficient as large as several hundred thousands.

Such an infrared absorbing compound is typically used for heat insulating films, sunglasses or the like purposes other than as a material for an optical recording medium.

The aminium salt compound of the present invention can be contained in the recording layer of an optical recording medium which contains an organic dye.

Generally known, near infrared-absorbing dyes are used together with the aminium salt of the present invention to form the organic dye recording layer of the optical recording medium. Examples of such dyes include cyanine dyes, merocyanine dyes, croconium dyes, squalium dyes, azulenium dyes, polymethine dyes, naphthoquinone dyes, pyrylium dyes, phthalocyanine dyes, naphthalocyanine dyes, naphtholactam dyes and the like.

Of the above organic dyes, cation type dyes represented by polymethine dyes, cyanine dyes and azulenium dyes are preferable from the viewpoint of optimizing the preservation stability of the recording layer. The cation type dyes below are especially preferred because they promote good recording sensitivity, as well as preventing the preservation stability from deteriorating, even when in the form of a mixture with the double salt compound of the invention.

Examples of useful cation dyes include:

(1) polymethine dyes expressed by the following formula (X):

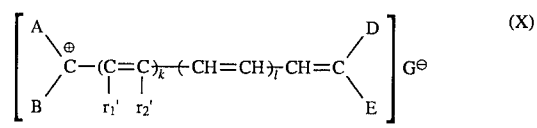

wherein A, B, D and E each indicate a hydrogen atom, or a group selected from the group consisting of a substituted or unsubstituted alkyl group, a substituted or unsubstituted alkenyl group, a substituted or unsubstituted aralkyl group, a substituted or unsubstituted aryl group, a substituted or unsubstituted styryl group and a substituted or unsubstituted heterocyclic group; $r_1'$ and $r_2'$ each indicate a hydrogen atom or a group selected from the group consisting of a substituted or unsubstituted alkyl group, a substituted or unsubstituted cyclic alkyl group, a substituted or unsubstituted alkenyl group, a substituted or unsubstituted aralkyl group, and a substituted or unsubstituted aryl group; k is 0 or 1; l is 0, 1 or 2; and $G^-$ indicates an anion;

(2) dyes expressed by the following formula (XI):

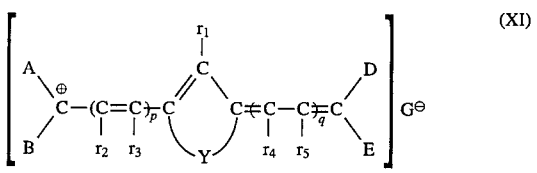

wherein A, B, D, E and $G^-$ each indicate the same as that described above; $r_1$ through $r_5$ each indicate a hydrogen atom, a halogen atom, a substituted or unsubstituted alkyl group or a substituted or unsubstituted aryl group; Y indicates a divalent organic residue having the atoms required to complete a 5-membered or 6-membered ring; and p and q are each 0, 1 or 2;

(3) dyes expressed by the following formula (XII):

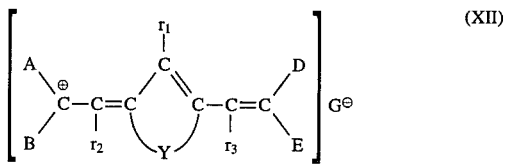

wherein A, B, D, E, $r_1$, $r_2$, $r_3$, Y and $G^-$ each represent the same as that described above;

(4) dyes expressed by the following formula (XIII):

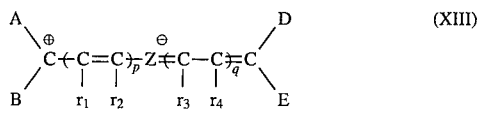

wherein A, B, D, E, $r_1$, $r_2$, $r_3$, $r_4$, p and q each represent the same as that described above; and
$Z^-$ is

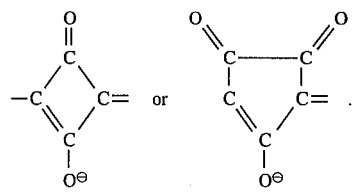

(5) azulenium dyes expressed by the following formula (XIV), (XV) or (XVI):

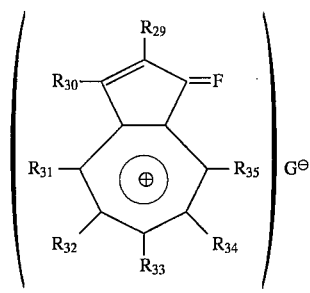

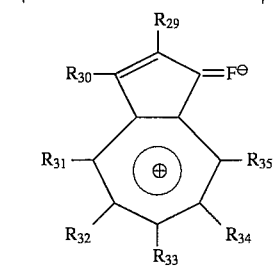

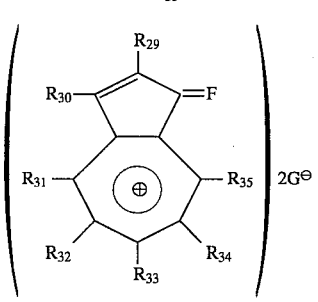

wherein $R_{29}$ through $R_{35}$ each represent a hydrogen atom, a halogen atom (chlorine atom, bromine atom, iodine atom), or a monovalent organic residue. The monovalent organic residue can be selected from a wide range monovalent organic groups.

Alternatively, at least one of the combinations of $R_{29}$ and $R_{30}$, $R_{30}$ and $R_{31}$, $R_{31}$ and $R_{32}$, $R_{32}$ and $R_{33}$, $R_{33}$ and $R_{34}$, and $R_{34}$ and $R_{35}$, may form a substituted or unsubstituted condensed ring. The condensed ring is a five-membered, six-membered or seven-membered condensed ring. Examples of such condensed rings include aromatic rings such as benzene, naphthalene, chlorobenzene, bromobenzene, methylbenzene, ethylbenzene, methoxybenzene, ethoxybenzene and the like rings; heterocycles such as furan, benzofuran, pyrrole, thiophene, pyridine, quinoline, thiazole and the like rings; aliphatic rings such as dimethylene, trimethylene, tetramethylene rings and the like. $G^-$ represents the same anion as that described above.

F represents a bivalent organic residue bonded by a double bond. Examples of such organic residues represented by F of the present invention include the groups expressed by the formulae (1) through (11) below. In each of the formulae, $Q^+$ represents the azulenium salt nucleus below, and the right side of each formula excluding Q+ represents the organic residue F.

Azulenium salt nucleus ($Q^+$)

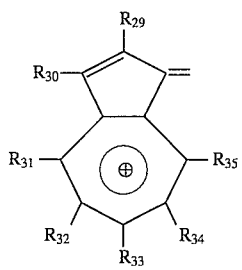

Formula

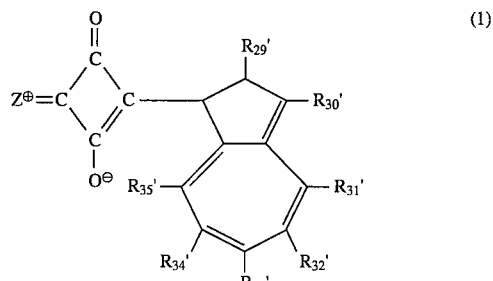

(1)

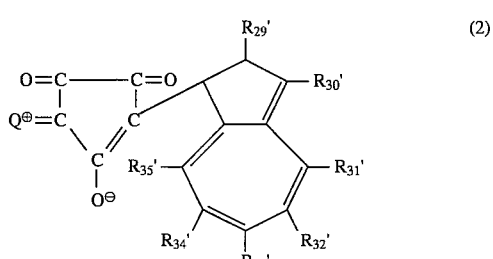

(2)

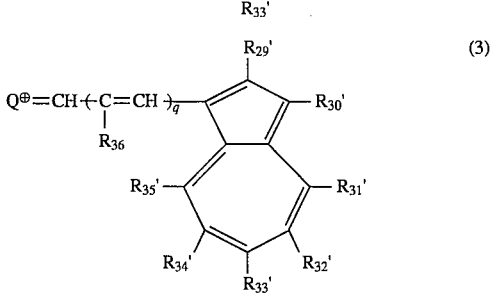

(3)

$R_{29}'$ through $R_{35}'$ are the same as $R_{29}$ through $R_{35}$.

The azulenium salt nucleus shown by Q+ may be either symmetrical or unsymmetrical with the azulene salt nucleus on the right side of the formula (3).

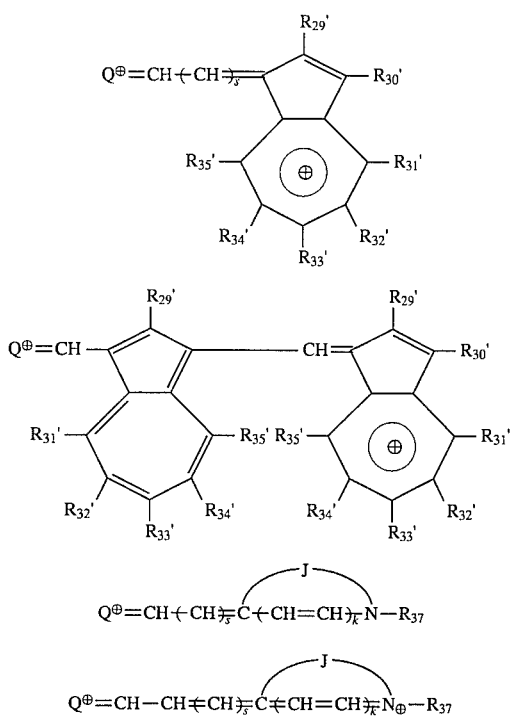

wherein J indicates the atoms which are preferably nonmetallic required to complete a nitrogen-containing heterocycle.

$$Q^{\oplus}=(CH)_s-R_{38} \qquad (8)$$

wherein $R_{38}$ is a substituted or unsubstituted aryl group or a cation group thereof.

$$Q^{\oplus}=(CH)_s-R_{39} \qquad (9)$$

wherein $R_{39}$ represents a heterocyclic group or a cation group thereof.

wherein $R_{40}$ represents a hydrogen atom, an alkyl group or a substituted or unsubstituted aryl group.

$$Q^{\oplus}=(CH)_s-C\equiv C-R_{38} \qquad (11)$$

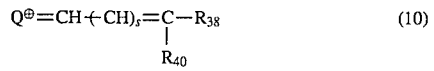

wherein $Z_2$ represents atoms required to complete a pyran, thiapyran, selenapyran, telluropyran, benzopyran, benzothiapyran, benzoselenapyran, benzotelluropyran, naphthopyran, naphthothiapyran, naphthoselenapyran or naphthotelluropyran ring. The group $Z_2$ may be substituted;

L is a sulfur atom, an oxygen atom, a selenium atom or a tellurium atom;

$R_{41}$ and $R_{42}$ each represent a hydrogen atom, an alkoxy group, a substituted or unsubstituted aryl group, an alkenyl group, or a heterocyclic group; and s represents an integer of 1 to 8.

Preferred examples of dyes include dyes expressed by the formulae (XVII), (XVIII), (XIV), (XX), (XXI), (XXII), (XXIII) and (XXIV).

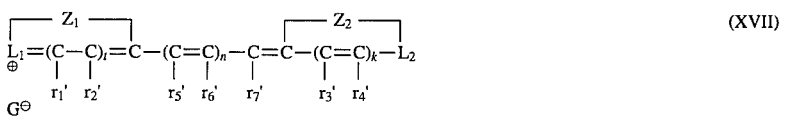

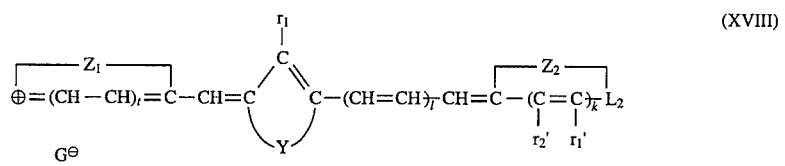

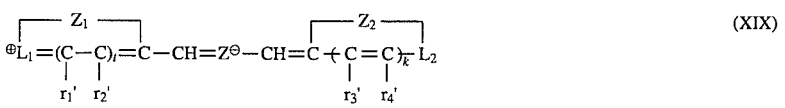

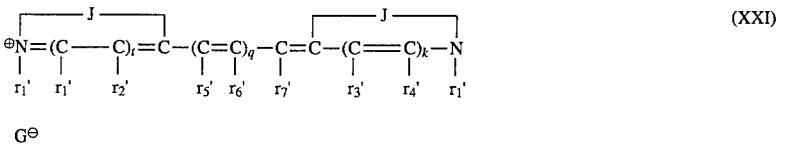

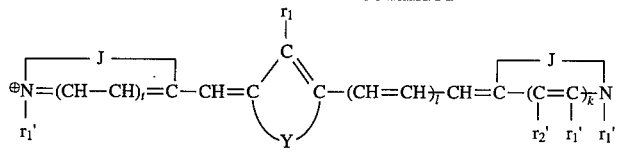

(XXII)

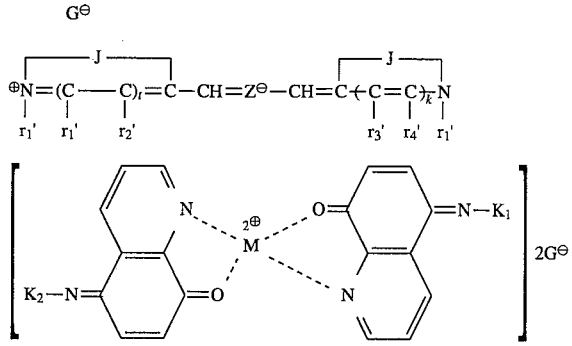

(XXIII)

(XXIV)

In the above formulas (XVII) to (XXIII), $L_1$ and $L_2$ each represent a substituted nitrogen atom, sulfur atom, oxygen atom, selenium atom or a tellurium oxygen. $Z_1$ represents the atoms required to complete a pyrylium, thiopyrylium, selenapyrylium, telluropyrylium, benzopyrylium, benzothiopyrylium, benzoselenapyrylium, benzotelluropyrylium, naphthopyrylium, naphthothiopyrylium, naphthoselenapyrylium or naphthotelluropyrylium ring, and may be substituted or unsubstituted; $Z_2$ represents the atoms required to complete a pyran, thiopyran, selenapyran, telluropyran, benzopyran, benzothiopyran, benzoselenapyran, benzotelluropyran, naphthopyran, naphthothiopyran, naphthoselenapyran or naphthotelluropyran ring, and may be substituted or unsubstituted; t is 0 or 1, and $R_{43}$ is a substituted or unsubstituted aryl group or a substituted or unsubstituted heterocyclic group; the symbols $r_1'$ through $r_7'$ each indicate a hydrogen atom, or a group selected from a substituted or unsubstituted alkyl group, a substituted or unsubstituted cyclic alkyl group, a substituted or unsubstituted alkenyl group, a substituted or unsubstituted aralkyl group and a substituted or unsubstituted aryl group; and the symbols k, q, J, $r_1$, Y, $Z^-$ and $G^-$ are each the same as that described above.

In addition, K1 and K2 in the above formula (XXIV) each represent a substituted or unsubstituted aromatic amine residue, such as a heterocyclic amine residue containing an nitrogen, oxygen or sulfur ion, or a group expressed by the following formula:

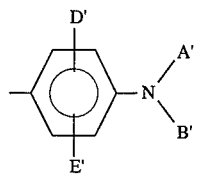

wherein A' and B' each represent a hydrogen atom or a $C_1$ to $C_{20}$ substituted or unsubstituted alkyl, aryl or cycloalkyl group; D' and E' each represent a hydrogen atom, an alkyl group, an alkoxy group or a halogen atom; and M' is a metal atom such as Ni, Cu, Co or Zn.

The symbols in the formulas are described in further detail below.

A, B, D and E each indicate a hydrogen atom or a substituted or unsubstituted alkyl group such as a methyl, ethyl, n-propyl, isopropyl, n-butyl, sec-butyl, isobutyl, t-butyl, n-amyl, t-amyl, n-hexyl, n-octyl or t-octyl group or the like; a cyclic alkyl group such as a cyclohexyl group or the like; an alkenyl group such as a vinyl, propenyl, butenyl, pentenyl, hexenyl, heptenyl, octenyl, dodecynyl, pulenyl group or the like; an aralkyl group such as a benzyl, phenetyl, α-naphthylmethyl, β-naphthylmethyl group or the like; a substituted aralkyl group such as a carboxybenzyl, sulfobenzyl, hydroxybenzyl group or the like; a substituted or unsubstituted aryl group such as a phenyl, α-naphtyl, β-naphtyl, tolyl, xylyl, biphenyl, ethylphenyl, chlorophenyl, dichlorophenyl, bromophenyl, dibromophenyl, nitrophenyl, diethylaminophenyl, dimethylaminophenyl, dimethoxyaminophenyl, dibenzylaminophenyl or the like.

The symbols $r_1$, $r_2$, $r_3$, $r_4$ and $r_5$ each indicate a hydrogen atom, a halogen atom such as a chlorine, bromine, iodine atom or the like; a substituted or unsubstituted alkyl group such as a methyl, ethyl, n-propyl, isopropyl, n-butyl, t-butyl, n-amyl, n-hexyl, n-octyl, 2-ethylhexyl or t-octyl group or the like; an alkoxy group such as methoxy, ethoxy, propoxy, butoxy or the like; a substituted or unsubstituted aryl group such as phenyl, tolyl, xylyl, ethylphenyl, chlorophenyl, nitrophenyl, dimethylaminophenyl, α-naphthyl, β-naphthyl or the like. Y indicates a divalent hydrocarbon group such as

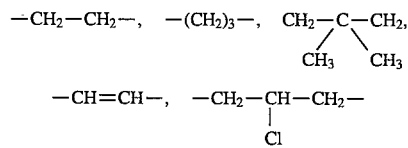

or the like. The five- or six-membered rings may be condensed with a benzene ring, a naphthalene ring or the like.

$R_{29}$ through $R_{35}$ and $R_{29}'$ through $R_{35}'$ each indicate a hydrogen atom; a halogen atom such as a fluorine, chlorine, bromine or iodine atom or the like; a substituted or unsubstituted alkyl group such as methyl, ethyl, n-propyl, isopropyl, n-butyl, t-butyl, n-amyl, n-hexyl, n-octyl, 2-ethylhexyl, t-octyl or the like; a substituted or unsubstituted alkoxy group such as methoxy, ethoxy, propoxy, butoxy or the like; a substituted or unsubstituted aryl group such as phenyl, tolyl, xylyl, ethylphenyl, chlorophenyl, nitrophenyl, dimethylaminophenyl, diethylaminophenyl, α-naphthyl, β-naphthyl, dipropylaminophenyl, dibenzylaminophenyl, diphenylaminophenyl or the like; a substituted or unsubstituted aralkyl group such as benzyl, 2-phenylethyl, 2-phenyl-1-methylethyl, bromobenzyl, 2-bromophenylethyl, methylbenzyl, nitrobenzyl or the like; an acyl group such as acetyl, propionyl, butyryl, valeryl, benzoyl, tolyoyl, naphthoyl, phthaloyl, furoyl or the like; a substituted or unsubstituted amino group such as amino, dimethylamino, diethylamino, dipropylamino, acetylamino, benzoylamino or the like; a substituted or unsubstituted styryl group such as styryl, dimethylaminostyryl, diethylaminostyryl, dipropylaminostyryl, methylstyryl or the like; a nitro group; a hydroxyl group; a carboxyl group; a cyano group; a substituted or unsubstituted arylazo group such as phenylazo, α-naphythylazo, β-naphthylazo, dimethylaminophenylazo, chlorophenylazo, nitrophenylazo, methoxyphenylazo, tolylazo or the like; a substituted or unsubstituted heterocyclic group such as pyridyl, quinolyl, lepidyl, methylpyridyl, furyl, thienyl, indolyl, pyrrole, carbazolyl, N-ethylcarbazolyl or the like; a 2,2-diphenylvinyl group; a 2-phenyl-2-methylvinyl group; a 2-(dimethylaminophenyl)-2-phenylvinyl group; a 2-(diethylaminophenyl)-2-phenylvinyl group; a 2-(dibenzylaminophenyl)-2-phenylvinyl group; a 2,2-di(diethylaminophenyl)vinyl group; a 2,2-di(methoxyphenyl)vinyl group; a 2,2-di(ethoxyphenyl)vinyl group; a 2-(dimethylaminophenyl)-2-methylvinyl group; a 2-(diethylaminophenyl)-2-ethylvinyl group or the like.

$R_{29}'$ through $R_{35}'$ may form a condensed ring in the same way as $R_{29}$ through $R_{35}$.

$R_{36}$ indicates a hydrogen atom; a nitro group; a cyano group; an alkyl group such as methyl, ethyl, propyl, butyl or the like; or an aryl group such as phenyl, tolyl, xylyl or the like.

$R_{37}$ indicates a substituted or unsubstituted alkyl group such as methyl, ethyl, n-propyl, isopropyl, n-butyl, t-butyl, n-amyl, n-hexyl, n-octyl, 2-ethylhexyl, t-octyl or the like; a cyclic alkyl group such as cyclohexyl, cyclopropyl or the like; an aralkyl group such as benzyl, 2-phenylethyl, 3-phenylpropyl, 4-phenylbutyl, α-naphthylmethyl, β-naphthylmethyl or the like; a substituted aralkyl group such as methylbenzyl, bromobenzyl or the like; an aryl group such as phenyl, tolyl, xylyl, α-naphthyl, β-naphthyl or the like; or a substituted aryl group such as chlorophenyl, dichlorophenyl, trichlorophenyl, ethylphenyl or the like.

$R_{38}$ indicates a substituted or unsubstituted aryl group such as phenyl, tolyl, xylyl, biphenyl, α-naphthyl, β-naphthyl, anthraryl, pyrenyl, chlorophenyl, dichlorophenyl, trichlorophenyl, bromophenyl, dibromophenyl, tribromophenyl, ethylphenyl, diethylphenyl, nitrophenyl, aminophenyl, dimethylaminophenyl, diethylaminophenyl, dipropylaminophenyl, morpholinophenyl, piperidinylphenyl, piperazinophenyl, diphenylaminophenyl, acetylaminophenyl, benzoylaminophenyl, acetylphenyl, benzoylphenyl, cyanophenyl or the like.

$R_{39}$ indicates a monovalent heterocyclic group induced from a heterocycle such as furan, thiophene, benzofuran, thionaphthene, dibenzofuran, carbazole, phenothiazine, phenoxazine, pyridine or the like.

$R_{40}$ indicates a hydrogen atom; an alkyl group such as methyl, ethyl, propyl, butyl or the like; or a substituted or unsubstituted aryl group such as phenyl, tolyl, xylyl, biphenyl, ethylphenyl, chlorophenyl, nitrophenyl, aminophenyl, dimethylaminophenyl, diethylaminophenyl, acetylaminophenyl, α-naphthyl, β-naphthyl, anthralyl, pyrenyl or the like.

$R_{41}$ and $R_{42}$ each indicate a hydrogen atom; an alkyl group such as methyl, ethyl, propyl, butyl or the like; an alkoxy group such as methoxy, ethoxy, propoxy or the like; an aryl group such as phenyl, tolyl, xylyl, chlorophenyl, biphenyl, methoxyphenyl or the like; a substituted or unsubstituted styryl group such as styryl, p-methylstyryl, o-chlorostyryl or the like; a substituted or unsubstituted 4-phenyl-1,3-butadienyl group such as 4-phenyl-1,3-butadienyl, 4-(p-methylphenyl)-1,3-butadienyl or the like; or a substituted or unsubstituted heterocyclic group such as quinolyl, pyridyl, carbazolyl, furyl or the like.

J indicates the atoms required to complete a nitrogen-containing heterocycle such as pyridine, thiazole, benzothiazole, naphthothiazole, oxazole, benzoxazole, naphthoxazole, imidazole, benzimidazole, naphthoimidazole, 2-quinoline, 4-quinoline, isoquinoline, indole or the like. The group J may be substituted by a halogen atom such as fluorine, chlorine, bromine, iodine or the like; an alkyl group such as methyl, ethyl, propyl, butyl or the like; an aryl group such as phenyl, tolyl, xylyl or the like; or an alkyl such as benzyl, p-trimethyl or the like.

$G^-$ indicates an anion such as a chloride, bromide, iodide, perchlorate, benzenesulfonate, p-toluenesulfonate, methyl sulfate, ethyl sulfate, propyl sulfate, tetrafluoroborate, tetraphenylborate, hexafluorophosphate, benzenesulfinate, acetate, trifluroacetate, propionate, benzoate, oxalate, succinate, malonate, oleate, stearate, citrate, monohydrogen diphosphate, dihydrogen monophosphate, pentachlorostannate, chlorosulfonate, fluorosulfonate, trifluoromethanesulfonate, hexafluoroantimonate, molybdate, tungstate, titanate, zirconate ion or the like.

The symbols $r_1'$, $r_2'$, $r_3'$, $r_4'$, $r_5'$, $r_6'$ and $r_7'$ each indicate a hydrogen atom; an alkyl group such as methyl, ethyl, n-propyl, isopropyl, n-butyl, sec-butyl, isobutyl, t-butyl, n-amyl, t-amyl, n-hexyl, n-octyl, t-octyl or the like; a cyclic alkyl group such as cyclohexyl or the like; a substituted or unsubstituted alkenyl group such as vinyl, propenyl, butenyl, pentenyl, hexenyl, heptenyl, octenyl, dodecynyl, prenyl or the like; an aralkyl group such as benzyl, phenethyl, α-naphthylmethyl, β-naphthylmethyl or the like; or a substituted aralkyl group such as carboxybenzyl, sulfobenzyl, hydroxybenzyl or the like.

The amount of the double salt compound of (a) an aminium salt cation shown by the formula (I) or (II) and (2) a metal complex anion, which is added to a dye, is 1 to 60% by weight, preferably 1 to 40% by weight, and more preferably 5 to 25% by weight, on the basis of the total solids content relative to the recording layer. The combination of a polymethine dye expressed by the formula (X) or (XI) or a cyanine dye expressed by the formula (XXI) or (XXII) and the double salt compound of the present invention is particularly preferred for use in an optical recording medium because the recording sensitivity, the preservation stability, and the light resistance of the recording layer are excellent. Further, the recording layer deteriorates less as a result of exposure to reproduction light.

In the present invention, a binder comprising an organic dye thin film may be contained in the recording layer. Examples of binders that can be used include cellulose esters such as nitrocellulose, cellulose phosphate, cellulose sulfate, cellulose acetate, cellulose propionate, cellulose butyrate, cellulose myristate, cellulose palmitate, cellulose acetate propionate, cellulose acetate butyrate and the like; cellulose ethers such as methyl cellulose, ethyl cellulose, propyl cellulose, butyl cellulose and the like; vinyl resins such as polystyrene, polyvinyl chloride, polyvinyl acetate, polyvinyl buryral, polyvinyl acetal, polyvinyl alcohol, polyvinyl pyrrolidone and the like; copolymer resins such as styrene-butadiene copolymers, styrene-acrylonitrile copolymers, styrene-butadiene-acrylonitrile copolymers, vinyl chloride-vinyl acetate copolymers and the like; acrylic resins such as polymethyl methacrylate, polymethyl acrylate, polybutyl acrylate, polyacrylic acid, polymethacrylic acid, polyacrylamide, polyacrylonitrile and the like; polyesters such as polyethylene terephthalate and the like; polyacrylate resins such as poly(4,4-isopropylidenediphenylene-co-1,4-cyclohexylenedimethylenecarbonate), poly(ethylenedioxy-3,3-phenylenethiocarbonate), poly(4,4-isopropylidenediphenylenethiocarbonate-co-terephthalate), poly(4,4-isopropylidenediphenylenecarbonate), poly(4,4-secbutylidenediphenylenecarbonate), poly(4,4-isopropylidenediphenylenecarbonate-block-oxyethylene) and the like; polyamides; polyimides; epoxy resins; phenolic resins; polyolefins such as polyethylene, polypropylene, chlorinated polyethylene and the like.

In addition, the recording layer may contain a surfactant, an anti-static agent, a stabilizer, a dispersing flame retardant, a lubricant, a plasticizer and the like. Further, an undercoat layer may be provided between the recording layer and the substrate, and a protective layer may be provided over the recording layer.

The undercoat layer is used for providing resistance to solvents or improving the reflectance or repeated reproduction properties. The protective layer is used to protect the recording layer from flaws, dust, soil and the like and to improve the environmental stability of the recording layer. An inorganic compound, a metal or an organic polymer compound is typically used as a material for those layers. Examples of useful inorganic compounds include $SiO_2$, $MgF_2$, SiO, $TiO_2$, ZnO, TiN, SiN and the like. Examples of useful metals include Zn, Cu, Ni, Al, Cr, Ge, Se, Cd and the like. Examples of useful organic polymer compounds include ionomer resins, polyamide resins, vinyl resins, natural polymers, epoxy resins, silane coupling agents, silicone resins, liquid rubber and the like.

Examples of materials that can be used as the substrate include plastics such as polyester, polycarbonate, acrylic resins, polyolefin resins, phenolic resins, epoxy resins, polyamide, polyimide and the like; glass; metals; and the like.

The organic solvent used for coating the layers depends upon the coating state, i.e., a dispersed state or a dissolved state. Examples of organic solvents that can be used include alcohols such as methanol, ethanol, isopropanol, diacetone alcohol and the like; ketones such as acetone, methyl ethyl ketone, cyclohexanone and the like; amides such as N,N-dimethylformamide, N,N-dimethylacetamide, and the like; sulfoxides such as dimethylsulfoxide and the like; ethers such as tetrahydrofuran, dioxane, ethylene glycol monomethyl ether and the like; esters such as methyl acetate, ethyl acetate, butyl acetate and the like; aliphatic halogenated hydrocarbons such as chloroform, methylene chloride, dichloroethylene, carbon tetrachloride, trichloroethylene and the like; aromatic hydrocarbons such as benzene, toluene, xylene, monochlorobenzene, dichlorobenzene and the like; aliphatic hydrocarbons such as n-hexane, cyclohexane, ligroin and the like; fluorine solvents such as tetrafluoropropanol, pentafluoropropanol and the like.

The coating of the layers can be performed by a coating method such as a dip coating method, a spray coating method, a spinner coating method, a bead coating method, a wire bar coating method, a blade coating method, a roller coating method, a curtain coating method or the like.

The thickness of the recording layer formed by using the above solvent is 50 Å to 100 μm, preferably 200 Å to 1 μm.

As described above, the present invention has the following advantageous effects:

(1) It is possible to improve significantly the light resistance of the organic dye used, thus effectively preventing the deterioration of the recording layer of the optical recording medium due to exposure by reproduction light. These advantages are achieved by combining the double salt compound of the invention together with the organic dye in the recording layer.

In addition, since photodeterioration is prevented even if the amount of the double salt compound added is small relative to the dye, an attempt can be made to improve the light-resistance of the recording layer, thus preventing the photodeterioration due to reproduction light, without causing the deterioration of the recording sensitivity of the optical recording medium.

(2) Since the combination of a metal complex and an aminium salt compound in which an alkoxyalkyl group, a morpholine ring, an alkenyl group or an alkynyl group is introduced easily dissolves in typically used organic solvents which do not affect plastics, the productivity of optical recording media is significantly increased.

(3) It is possible to obtain an optical recording medium exhibiting excellent preservation stability under conditions of high temperature and high humidity.

(4) It is possible to obtain an optical recording medium having a distinct threshold value for laser power without degrading the high reflectance and high sensitivity of the organic dye used.

EXAMPLES

Although the present invention is described in more detail below with reference to the following specific examples, the present invention is not limited to the examples.

Synthetic Example 1

Double salt compound No. (I)-4 was synthesized by the following method:

1.4 g of nickel (II) bisdithiobenzyl (trade name: MIR-101 manufactured by Midori Chemical) and 1.8 g of p-phenylenediamine were dissolved in 10 ml of dimethylsulfoxide. 60 ml of ethanol solution containing 3.2 g tetrabutylammonium bromide was then added dropwise to the resulting solution. The solution was then agitated to separate red needle-like crystals. The crystals obtained were then filtered off, washed with water, and purified by recrystallization to obtain 0.8 g nickel (II) bisdithiobenzyl tetrabutylammonium. When the absorption spectrum of the crystals was measured, the usual λmax 930 nm of MIR-101 had been shifted to a longer wavelength of 950 nm. This shift confirmed that MIR-101 had changed to an anion.

0.5 g of the nickel bisditiobenzyl tetrabutylammonium was added to 50 ml of a solution of 0.5 g of N,N,N',N'-tetrakis-(p-dimethoxyethylaminophenyl)-p-benzoquinoneaminiumperchlorate in DMF, followed by heating at 50° C. for 30 hours with agitation. The reaction solution was then poured into water, and the precipitate obtained were washed with water, dried and then recrystallized to obtain 0.7 g of a double salt compound.

When the double salt compound was measured by a differential scanning calorimeter, the peak of the perchlorate usually at 270° C. had disappeared. This result and elemental analysis confirmed that the intended double salt compound had been obtained.

| Elemental analysis values: $C_{82}H_{96}N_6O_8S_4Ni$ (molecular weight 1480.670) | | | |
|---|---|---|---|
| | C | H | N |
| Calculated value | 66.52% | 6.54% | 5.68% |
| Measured value | 66.28% | 6.65% | 5.60% |

Synthetic Example 2

Double salt compound (I)-15 was synthesized by the following method:

1.0 g N,N,N',N'-tetrakis-(p-dipropenylaminophenyl)-p-benzoquinone-aminiumperchlorate was dissolved in 90 ml DMF. 0.7 g nickel-bis(trichlorobenzenedithiol) tetra(n-butyl)ammonium (trade name PA-1006 manufactured by Mitsui Toatsu Fine Co., Ltd.) was added to the resulting solution, followed by heating at 50° C. for 3 hours with agitation. The reaction solution was then poured into water to obtain a precipitate. The precipitate obtained was washed with water, dried and then recrystallized to obtain 0.95 g of a double salt compound.

When the compound was measured by a differential scanning calorimeter, the usual peak of the perchlorate at 270° C. had disappeared. This result and the elemental analysis confirmed that the intended double salt compound had been obtained.

| Elemental analysis values: $C_{66}H_{62}N_6Cl_6S_4Ni$ (molecular weight 1338.948) | | | |
|---|---|---|---|
| | C | H | N |
| Calculated value | 59.21% | 4.67% | 6.28% |
| Measured value | 59.33% | 4.81% | 6.22% |

Synthetic Example 3

Double salt compound (II)-4 was synthesized by the following method:

0.7 g N,N,N',N'-tetrakis-(2-methylpyrrolidinophenyl)-p-benzoquinone-aminiumperchlorate was dissolved in 70 ml DMF. 0.68 g nickel-bis(trimethoxybenzenedithiol) tetra(n-butyl)ammonium was added to the resulting solution, followed by heating at 50° C. for 3 hours with agitation. The reaction solution was then poured into water to obtain a precipitate. The precipitate obtained was washed with water, dried and then recrystallized to obtain a double salt compound.

When the compound was measured by a differential scanning calorimeter, the usual peak of the perchlorate at 270° C. had disappeared. This result and the elemental analysis confirmed that the intended double salt compound had been obtained.

| Elemental analysis values: $C_{90}H_{108}N_6O_{12}S_4Ni$ (molecular weight 1652.850) | | | |
|---|---|---|---|
| | C | H | N |
| Calculated value | 65.40% | 6.59% | 5.09% |
| Measured value | 65.29% | 6.51% | 5.14% |

Example 1

Pre-grooves (12) comprising strips, each having a width of 3 μm and a length of 85 mm at a pitch of 12 μm, were provided by a heat press method on a polycarbonate (referred to as "PC" hereinafter) substrate (11) of a wallet size (54 mm long and 85 mm wide) and having a thickness of 0.4 mm. A solution obtained by dissolving (1) 3 parts by weight of a mixture containing IR-820 (manufactured by Nippon Kayaku Co., Ltd.) as a polymethine dye and the above double salt compound No. (I)-1 at a ratio by weight of 80:20 in (2) 97 parts by weight of diacetone alcohol, was coated on the substrate (11) by a bar coating method to obtain a recording layer (13) having a thickness of 950 Å.

Figure 2:
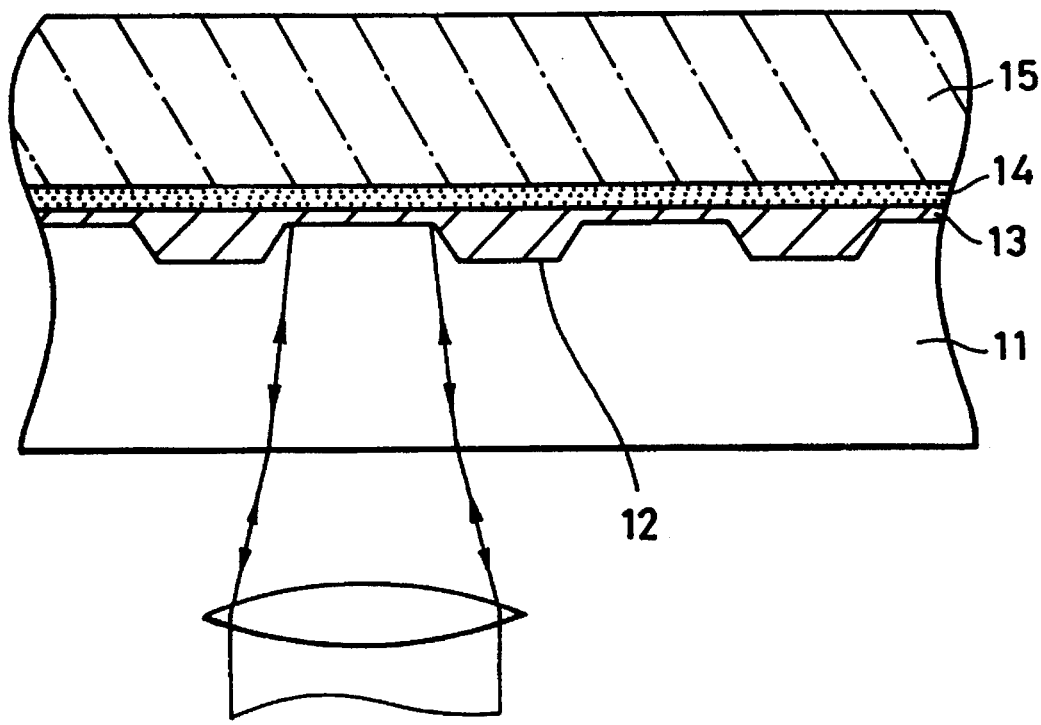
FIG. 2 is a schematic sectional view taken along line II, II' in the optical card shown in FIG. 1.

A wallet-size PC substrate (15) having a thickness of 0.3 mm was then laminated over the recording layer (13) through an acrylate-ethylene copolymer dry film (14) and was bonded thereto by heat rolling to produce an optical card with an adhesive structure (refer to FIGS. 1 and 2).

Using an optical card recording/reproducing apparatus (manufacture by Canon Inc., the reflectance of the recording layer was measured by applying a semiconductor laser beam which had an oscillation wavelength of 830 nm and an output of 0.2 mW, to the above-described optical card having a thickness of 0.4 mm. Information was recorded on the tracks between the respective pregrooves by a semiconductor laser having an oscillation wavelength of 830 nm with a recording power of 3.5 mW and a recording pulse of 80 μsec. The information was reproduced with a reproducing power of 0.2 mW through a PC substrate having a thickness of 0.4 mm while driving the optical card in the direction of the pregrooves at a rate of 60 mm/sec. The contrast ratio [(A−B)/A] (A: signal strength of unrecorded portion, B: signal strength of recorded portion) was measured.

The reflectance and contrast of the optical card were also measured after the card was allowed to stand at 65° C. and 85% RH for 1000 hours to test environmental preservation stability.

Another optical card was formed by the same method as described above, and information was recorded thereon. After the optical card was irradiated with a xenon lamp light of 1 kW/m² for 200 hours, the reflectance and contrast were measured to test light resistance stability.

The results obtained are shown in Table 4.

Example 2

An optical card was produced by the same method as that employed in Example 1, except that the double salt compound No. (I)-1 used in Example 1 was changed to the double salt compound No. (I)-4. The optical card was evaluated by the same methods as described above for Example 1. The results obtained are shown in Table 4.

TABLE 4

| Example | Initial Reflectance (%) | Initial Contrast ratio | Environmental preservation stability After storage at 65° C. and 85% RH for 1000 hr Reflectance (%) | Contrast ratio | Light-resistance stability after irradiation with xenon lamp of 1 kW/m² for 200 hr Reflectance (%) | Contrast ratio |
|---|---|---|---|---|---|---|
| 1 | 15.1 | 0.65 | 13.6 | 0.58 | 13.0 | 0.55 |
| 2 | 15.2 | 0.66 | 13.8 | 0.59 | 13.2 | 0.57 |

Examples 3 and 4

An optical card was produced by the same method as that described for Example 1, except that the combination of the polymethine dye and the double salt compound, which was used in Example 1, was changed to each of the combinations of dyes and double salt compounds shown be low.

| Example | Organic dye | Double salt compound No. | Ratio by weight |
|---|---|---|---|
| 3 | 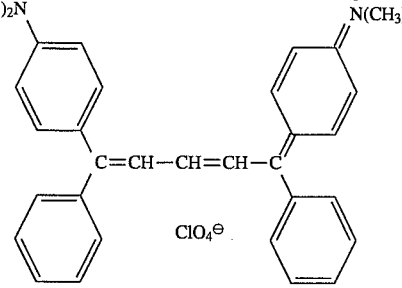 | (I)-1 | 85:15 |
| 4 | " | (I)-15 | 85:15 |

Comparative Example 1

An optical card was produced by the same method as that described for Example 3, except that the double salt compound (I)-1 used in Example 3 was lacking. The resulting optical card was evaluated by the same methods.

The results of evaluating Examples 3 and 4 and Comparative Example 1 are shown in Table 5.

TABLE 5

| Example | Initial Reflectance (%) | Initial Contrast ratio | Environmental preservation stability After storage at 65° C. and 85% RH for 1000 hr Reflectance (%) | Contrast ratio | Light-resistance stability after irradiation with xenon lamp of 1 kW/m² for 200 hr Reflectance (%) | Contrast ratio |
|---|---|---|---|---|---|---|
| 3 | 16.0 | 0.68 | 13.9 | 0.58 | 13.2 | 0.56 |
| 4 | 16.1 | 0.69 | 14.0 | 0.58 | 13.4 | 0.57 |
| 1* | 16.6 | 0.71 | 13.9 | 0.56 | 6.7 | immeasurable |

1*) Comparative Example No.

Comparative Examples 2 to 4

An optical card was produced by the same method as that described for Example 3, except that the double salt compound No. (I)-1 used in Example 3 was changed to each of the compounds shown in Table 6 below.

TABLE 6
Comparative Example 2
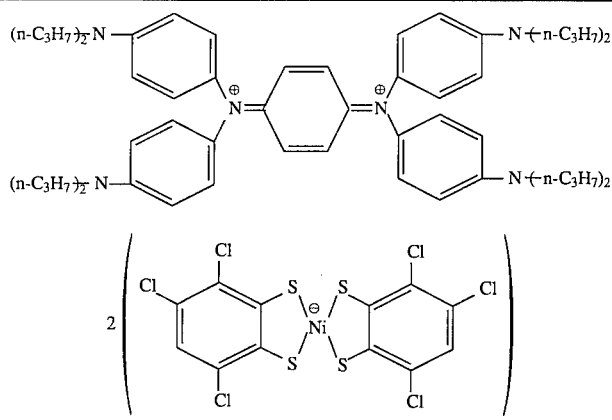
Comparative Example 3
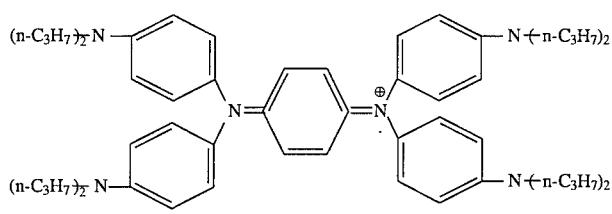
Comparative Example 4
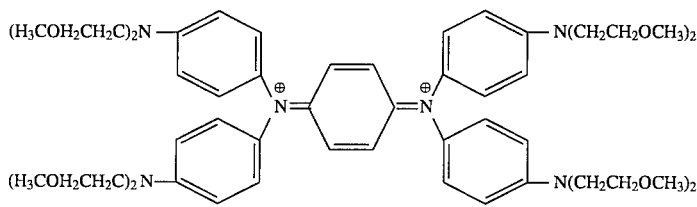
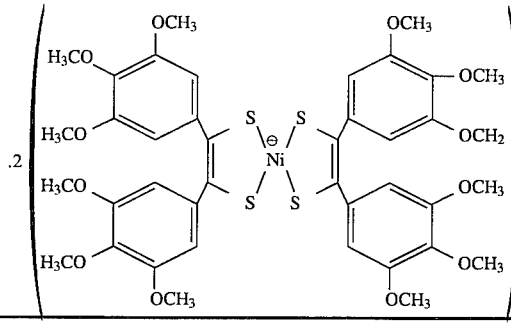
Comparative Example 5
An optical card was produced by the same method as that described for Example 3, except that the double salt compound No. (I)-1 used in Example 3 was changed to double salt compound expressed by the following formula. The card was evaluated by the same method.

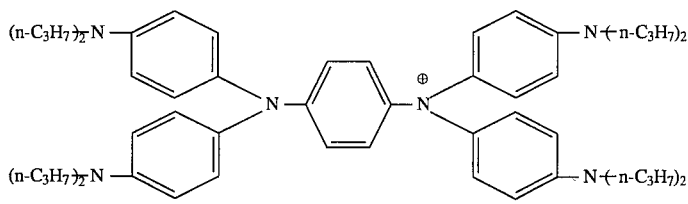

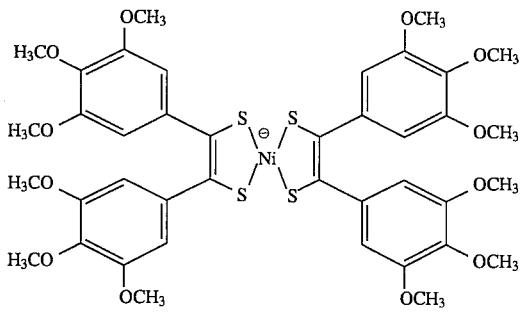

Comparative Example 6

An optical card was produced by the same method as that described for Example 4, except that the double salt compound No. (I)-15 used in Example 4 was changed to a double salt compound expressed by the following formula, and was evaluated by the same method.

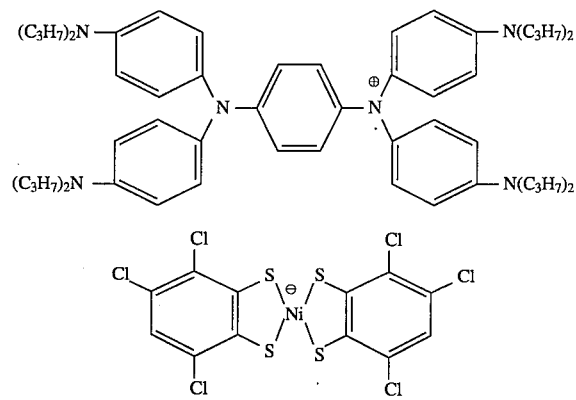

The optical cards of Example 5 and Comparative Example 7 were attached to the optical card recording/reproducing apparatus (manufactured by Canon Inc.). The reflectance of the light reflected from the recording layer of each of the optical cards was measured by continuously applying a semiconductor laser having an oscillation wavelength of 830 nm and an output of 0.2 mW to a point of the recording layer and through the PC substrate having a thickness of 0.4 mm without driving the optical card. The reproduction light deterioration time was determined by measuring the time required for the initial reflectance value of the recording layer to decrease by 5%, 95% of the initial reflectance value. The results of these measurements of Example 5 and Comparative Example 7 are shown in Table 8.

TABLE 7

| Comparative Example | Initial | | Environmental preservation stability After storage at 65° C. and 85% RH for 1000 hr | | Light-resistance stability after irradiation with xenon lamp of 1 kW/m$^2$ for 200 hr | |
|---|---|---|---|---|---|---|
| | Reflectance (%) | Contrast ratio | Reflectance (%) | Contrast ratio | Reflectance (%) | Contrast ratio |
| 2 | 16.0 | 0.68 | 11.1 | 0.47 | 13.1 | 0.56 |
| 3 | 15.9 | 0.68 | 13.5 | 0.56 | 11.0 | 0.48 |
| 4 | 16.2 | 0.69 | 11.9 | 0.49 | 13.2 | 0.55 |
| 5 | 16.1 | 0.68 | 13.7 | 0.56 | 13.0 | 0.54 |
| 6 | 16.0 | 0.68 | 13.8 | 0.55 | 13.1 | 0.55 |

Example 5 and Comparative Example 7

An optical card of Example 5 was produced by the same method as that described for Example 3, and an optical card of Comparative Example 7 was produced by the same method as that employed in Comparative Example 5.

TABLE 8

| | Reproduction light deterioration time (sec) |
|---|---|
| Example 5 | 250 |
| Comparative Example 7 | 160 |

Example 6 and Comparative Example 8

An optical card of Example 6 was produced by the same method as that employed in Example 4, and an optical card of Comparative Example 8 was produced by the same method as that employed in Comparative Example 6.

The reproducing light deterioration time of each of the optical cards of Example 6 and Comparative Example 8 was measured by the same method as that employed in Example 5.

The results of measurement of Example 6 and Comparative Example 8 are shown in Table 9.

TABLE 9

| | Reproduction light deterioration time (sec) |
|---|---|
| Example 6 | 245 |
| Comparative Example 8 | 150 |

Examples 7 to 11

An optical card was produced by the same method as that described for Example 1, except that the combination of the polymethine dye and the double sample compound, which was used in Example 1, was changed to each of the combinations shown in Table 10.

Comparative Example 9

An optical card was produced by the same method as that employed in Example 11, except that the double salt compound No. (I)-11 used in Example 8 was removed.

The results of measurement of Examples 7 to 11 and Comparative Example 9 are shown in Table 11.

TABLE 10

| Example | Organic dye | Double salt compound No. | Ratio by weight |
|---|---|---|---|
| 7 | 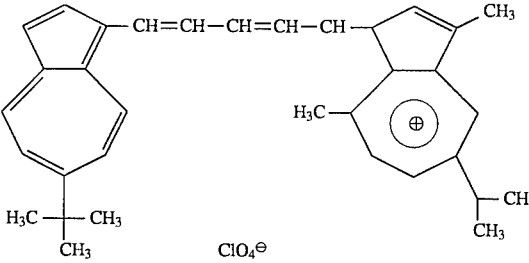 | (II)-4 | 80:20 |
| 8 | 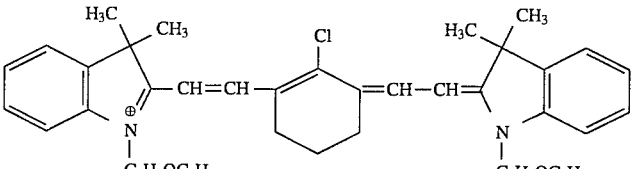 | (II)-11 | 90:10 |
| 9 | 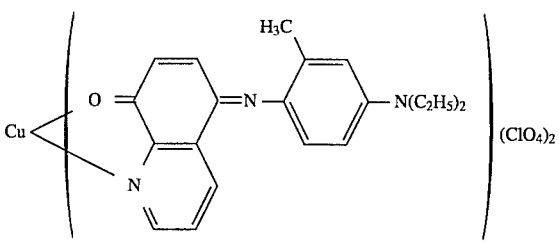 | (I)-13 | 95:5 |

TABLE 10-continued

| Example | Organic dye | Double salt compound No. | Ratio by weight |
|---|---|---|---|
| 10 | [Structure: symmetric cyanine dye with two indoline units bearing gem-dimethyl and N-SO$_3$H substituents connected by -CH=CH-CH=CH-CH=CH-CH= polymethine chain, with I$^\ominus$ counterion] | (II)-3 | 85:15 |
| 11 | [Structure: tetrakis(4-diethylaminophenyl) pentamethine dye C=CH-CH=CH-C with SbF$_6^\ominus$ counterion] | (I)-3 | 75:25 |

TABLE 11

| | Initial | | Environmental preservation stability After storage at 65° C. and 85% RH for 1000 hr | | Light-resistance stability after irradiation with xenon lamp of 1 kW/m$^2$ for 200 hr | |
|---|---|---|---|---|---|---|
| Example | Reflectance (%) | Contrast ratio | Reflectance (%) | Contrast ratio | Reflectance (%) | Contrast ratio |
| 7 | 15.6 | 0.65 | 13.6 | 0.57 | 13.1 | 0.55 |
| 8 | 16.0 | 0.68 | 13.8 | 0.58 | 13.0 | 0.55 |
| 9 | 16.1 | 0.70 | 13.2 | 0.58 | 12.9 | 0.55 |
| 10 | 16.0 | 0.68 | 13.6 | 0.58 | 13.1 | 0.56 |
| 11 | 15.6 | 0.67 | 13.9 | 0.60 | 13.7 | 0.60 |
| 9* | 19.4 | 0.70 | 13.6 | 0.57 | 5.9 | immeasurable |

9*: Comparative Example No

Examples 12 to 15

A PC substrate in circular shape having a diameter of 130 mm$\phi$ and a thickness of 1.2 mm was produced by injection molding and provided with spiral tracking grooves having a width of 0.6 μm and a pitch of 1.6 μm formed on the surface thereof. A solution obtained by dissolving (1) 5 parts by weight of each of the mixtures of the organic dyes shown in Table 12 below and (2) the double salt compounds in 95 parts by weight of diacetone alcohol was coated on the grooves surface of the substrate by spin coating to form a recording layer having a thickness of 950 Å. Another protective PC substrate was laminated over the recording layer by using an ultraviolet-curing adhesive with spacers of 0.3 mm being provided at the inner and outer peripheral sides of the recording layer. As a result, an optical disk having an air sandwich structure was obtained.

Information was then written on the thus-produced optical disk with a recording power of 8 mW and a recording frequency of 3 MHz. The recorded information was read with a reading power of 0.8 mW by applying a semiconductor laser beam having an oscillation wavelength of 830 nm to the disk through a PC substrate while rotating the optical disk att 1800 rpm. The C/N ratio (carrier/noise ratio) was measured by spectrum analysis of the reproduced waveform (scanning filter, band width 30 kHz).

The C/N ratio was also measured after information was repeatedly reproduced $10^5$ times from the portion of the optical disk on which information was recorded. In addition, the reflectance of recording light having a wavelength of 830 nm was measured through the PC substrate by a spectrophotometer (trade name: U-3400 manufactured by Hitachi Inc.).

The optical disk was also subjected to tests for environmental preservation stability and light-resistance stability under the same conditions as those in Example 1. The same disk was then tested with respect to the reflectance of the recording layer and the C/N ratio of the recording pit. The results obtained are shown in Table 13.

TABLE 12

| Example | Organic dye | Double salt compound No. | Ratio by weight |
|---|---|---|---|
| 12 | 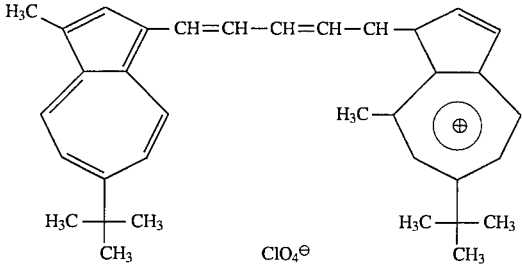 | (I)-8 | 80:20 |
| 13 | IR-820 (produced by Nippon Kayaku Co., Ltd.) | (I)-9 | 85:15 |
| 14 | 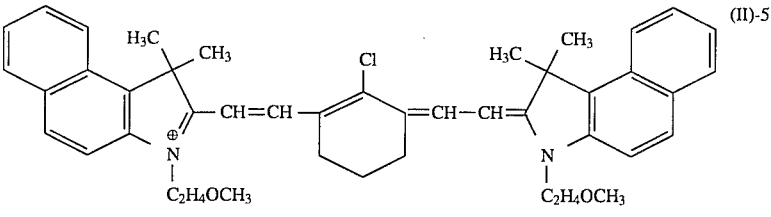 | (II)-5 | 80:20 |
| 15 | 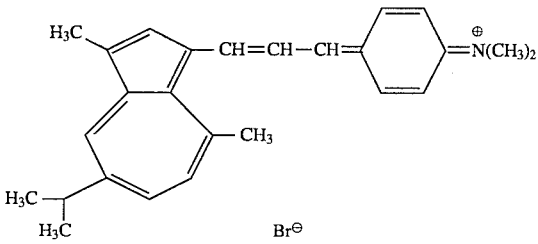 | (I)-5 | 95:5 |

Comparative Examples 10 and 11

Optical disks were produced by the same methods as those employed in Examples 12 and 15 respectively, except that the double salt compound Nos. (I)-8 and (I)-5 used in Examples 12 and 15 were lacking from the recording layer. These disks were evaluated by the same methods, and the results obtained are shown in Table 13.

Comparative Example 12

An optical disk was produced by the same method as that employed in Example 12 with the exception that the metal complex compounds below were substituted for the double salt compound No. (I)-8 used in Example 12. The results are shown in Table 13.

As seen from Table 13, because crystals separated out after coating due to the low solubility of the metal complex compound, the signal reproduced from the optical disk exhibited a very wide noise level. Thus, the C/N ratio could not be measured.

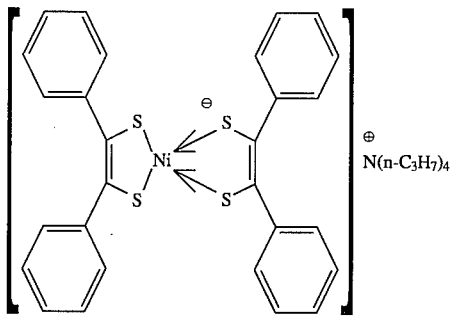

TABLE 13

| Example | Initial Reflectance (%) | Initial C/N (dB) | After 10⁵ repeated reproductions C/N (dB) | Environmental preservation stability After storage at 65° C. and 85% RH for 1000 hr Reflectance (%) | Environmental preservation stability After storage at 65° C. and 85% RH for 1000 hr C/N (dB) | Light-resistance stability After irradiation with xenon lamp of 1 kW/m² for 200 hr Reflectance (%) | Light-resistance stability After irradiation with xenon lamp of 1 kW/m² for 200 hr C/N (dB) |
|---|---|---|---|---|---|---|---|
| 12 | 26.2 | 56.7 | 53.8 | 23.6 | 50.5 | 22.8 | 49.9 |
| 13 | 26.5 | 57.7 | 55.4 | 24.4 | 53.7 | 23.9 | 52.5 |
| 14 | 26.8 | 59.0 | 54.4 | 23.7 | 51.4 | 22.8 | 50.8 |
| 15 | 26.8 | 58.5 | 53.8 | 22.8 | 50.3 | 23.0 | 50.9 |
| 10* | 27.3 | 61.1 | 46.7 | 23.7 | 51 | 13.7 | x |
| 11* | 30.2 | 60.4 | 38.9 | 23.0 | 50.3 | 12.1 | x |
| 12* | 26.1 | x | — | 20.9 | — | 18.3 | — |

10*, 11* and 12*: Comparative Examples Nos.
x: immeasurable

Examples 16 and 17

A spiral regroove was provided on a polymethyl methacrylate (hereinafter referred to as "PMMA") substrate in circular shape having a diameter of 130 mmφ and a thickness of 1.2 mm by a 2P method (photopolymer method) using an epoxy-acrylate ultraviolet-curing resin. An optical disk was produced by the same method as that employed in Example 12, except that a solution obtained by dissolving in 1,2-dichloroethane 2 parts by weight of each of the combinations of the organic dyes and double salt compounds shown in Table 14 was coated on the substrate by the spinner coating method to form a recording layer. The recording layer comprised an organic thin film having a dry thickness of 900 Å.

The thus-produced optical disk was evaluated by the same tests as that performed in Example 12. The results are shown in Table 16.

Examples 18 and 19

An optical disk was produced by the same method as that employed in Example 8, except that a solution obtained by dissolving (1) 4 parts by weight of each of the combinations of the organic dyes and double salt compounds shown in Table 15 and (2) 1 part by weight of nitrocellulose resin (Orhaless Lacquer manufactured by Deicel Chemical Industries, Ltd.) in (3) 95 parts by weight of diacetone alcohol was coated on a polycarbonate substrate in circular shape. The substrate had a diameter of 130 mmφ, a thickness of 1.2 mm, and was provided with pregrooves. The resulting recording layer comprised an organic thin film having a dry thickness of 950 Å.

The thus-produced optical disk was evaluated by the same tests as that performed in Example 8. The results are shown in Table 16.

TABLE 14

| Example | Organic dye | Double salt compound No. | Ratio by weight |
|---|---|---|---|
| 16 | 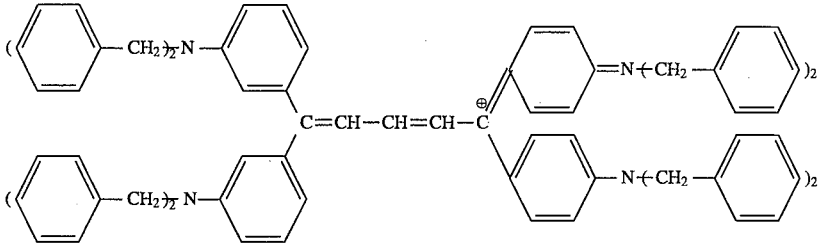 | (II)-2 | 90:10 |
| 17 | 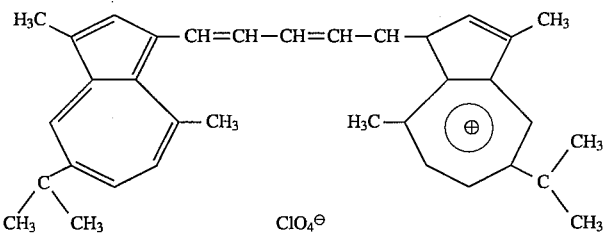 | (I)-2 | 85:15 |

TABLE 15

| Example | Organic dye | Double salt compound No. | Ratio by weight |
|---|---|---|---|
| 18 | 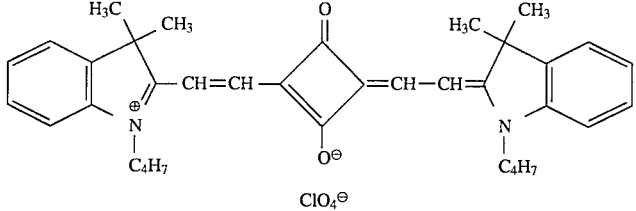 | (I)-14 | 75:25 |
| 19 | 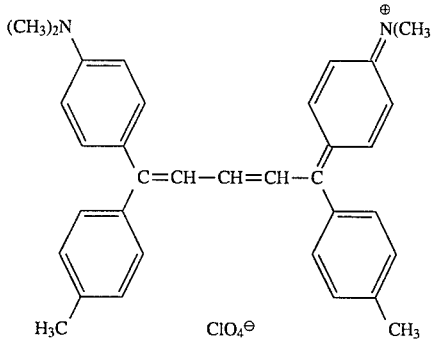 | (II)-9 | 80:20 |

TABLE 16

| | Initial | | After $10^5$ repeated reproductions | Environmental preservation stability After storage at 65° C. and 85% RH for 1000 hr | | Light-resistance stability After irradiation with xenon lamp of 1 kW/m² for 200 hr | |
|---|---|---|---|---|---|---|---|
| Example | Reflectance (%) | C/N (dB) | C/N (dB) | Reflectance (%) | C/N (dB) | Reflectance (%) | C/N (dB) |
| 16 | 26.3 | 59.2 | 55.1 | 22.6 | 50.9 | 22.4 | 49.7 |
| 17 | 26.5 | 59.7 | 55.5 | 23.3 | 51.9 | 22.8 | 51.3 |
| 18 | 25.1 | 54.0 | 51.8 | 22.1 | 47.4 | 22.1 | 48.1 |
| 19 | 25.2 | 53.0 | 50.4 | 22.1 | 46.1 | 22.0 | 46.1 |

Example 20

A solution obtained by dissolving (1) 3 parts by weight of the mixture of organic dye and double salt compound No. (I)-1 (weight ratio 80:20) that was used in Example 1 in (2) 97 parts by weight of diacetone alcohol was coated on the wallet size PC substrate of Example 1 by the roll coating method to produce a recording layer. The substrate had a thickness of 0.4 mm and was provided with pregrooves. The resulting recording layer had a dry thickness of 1000 Å.

Recording layers were continuously coated on 200 PC substrates, which were 0.4 mm thick, by the same method as that described above, and 200 optical cards were then produced by the same method as that employed in Example 1.

Each of the optical cards was numbered in order of coating. Then card Nos. 1, 10, 50, 100 and 200 which were produced by using the substrate Nos. 1, 10, 50, 100 and 200 was attached to an optical card recording/reproducing apparatus. Information was recorded on the recording tracks between the respective pregrooves by using a semiconductor laser from the side of the PC substrate while driving the optical card in the direction along the pregrooves at a rate of 60 mm/sec. The semiconductor layer had an oscillation wavelength of 830 nm with a spot size of 3 μmϕ, a recording power of 3.5 mW, and a recording pulse of 50 μsec. The information was then read with a reading power of 0.2 mW, and the C/N ratio was measured by spectrum analysis of the reproduced waveform (scanning filter band width 1 kHz). The results obtained are shown in Table 17.

Example 21

200 optical cards were produced by the same method as that employed in Example 20 with the exception that the double salt compound No. (I)-1 used in Example 20 was changed to No. (I)-8. The C/N ratios of optical card Nos. 1, 10, 50, 100 and 200 in order of coating were measured by the same method as that employed in Example 20. The results obtained are shown in Table 17.

Example 22

200 optical cards were produced by the same method as that employed in Example 20 with the exception that the double salt compound No. (I)-1 used in Example 20 was changed to No. (I)-4. The C/N ratios of optical card Nos. 1, 10, 50, 100 and 200 in order of coating were measured by the same method as that employed in Example 20. The results obtained are shown in Table 17.

Comparative Example 13

200 optical cards were produced by the same method as that employed in Example 20 with the exception that the double salt compound No. (I)-1 used in Example 20 was changed to the double salt compound used in Comparative Example 6. The C/N ratios of optical card Nos. 1, 10, 50, 100 and 200 were measured by the same method as that employed in Example 20. The results obtained are shown in Table 1.

TABLE 17

|  | C/N ratio (noise level) (dB) | | | | |
| --- | --- | --- | --- | --- | --- |
|  | No. 1 | No. 10 | No. 50 | No. 100 | No. 200 |
| Example 20 | 49.8 | 49.8 | 49.7 | 49.7 | 49.6 |
|  | (−68.0) | (−68.0) | (−68.0) | (−67.9) | (−67.8) |
| Example 21 | 49.5 | 49.5 | 49.4 | 49.4 | 49.3 |
|  | (−67.9) | (−67.9) | (−67.8) | (−67.8) | (−67.7) |
| Example 22 | 49.7 | 49.7 | 49.7 | 49.6 | 49.6 |
|  | (−68.0) | (−68.0) | (−68.0) | (−67.9) | (−67.8) |
| Comparative Example 13 | 48.5 | 48.3 | 47.9 | 45.5 | 44.2 |
|  | (−67.2) | (−67.1) | (−66.8) | (−64.5) | (−62.3) |

In Comparative Example 13, the noise level increased and the the C/N ratio decreased as the coating numbers of disks increased. This is possibly caused by the low solvent solubility of the double salt compound used in Comparative Example 14. Solid crystals, for example, are easily produced by only a small change in the concentration of the coating solution during the coating of a plurality of substrates, resulting in increased noise levels. On the other hand, the combination of the aminium salt cation and the metal complex anion used in each of Examples 20 to 22 of the present invention exhibits a high solubility in a solvent that does not affect plastics. Thus, hardly any crystals are produced by concentration changes during processing. It is thus thought that no crystals are formed in the recording layer, thereby constantly producing recording media having low noise levels.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent elements and functions.

What is claimed is:

1. An optical recording medium comprising a substrate and a recording layer, wherein said recording layer contains an organic dye and a compound expressed by the following formula (I):

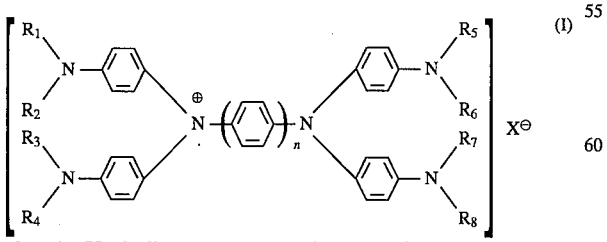

wherein $X^-$ indicates a monovalent metal complex anion; and $R_1$ through $R_8$ each indicate a hydrogen atom or a monovalent organic residue, and at least one of $R_1$ through $R_8$ is a monovalent organic residue selected from the group consisting of a substituted or unsubstituted alkoxyalkyl group, substituted or unsubstituted alkenyl group, substituted or unsubstituted alkynyl group and substituted or unsubstituted aralkyl group; and n is 1 or 2.

2. An optical recording medium according to claim 1, wherein each of $R_1$ through $R_8$ is an organic residue having 2 to 8 carbon atoms.

3. An optical recording medium according to claim 2, wherein each of $R_1$ through $R_8$ is an organic residue having 3 to 8 carbon atoms.

4. An optical recording medium according to claim 1, wherein at least two of the combinations of the organic residues $R_1$ and $R_2$, $R_3$ and $R_4$, $R_5$ and $R_6$ and $R_7$ to $R_8$ are monovalent organic residues selected from the group consisting of a substituted or unsubstituted alkoxyalkyl group, substituted or unsubstituted alkenyl group, substituted or unsubstituted alkynyl group and substituted or unsubstituted aralkyl group.

5. An optical recording medium according to claim 1, wherein all of $R_1$ through $R_8$ are monovalent organic residues selected from the group consisting of a substituted or unsubstituted alkoxyalkyl group, substituted or unsubstituted alkenyl group, substituted or unsubstituted alkynyl group and substituted or unsubstituted aralkyl group.

6. An optical recording medium according to claim 1, wherein said metal complex anion is expressed by the following formula (III):

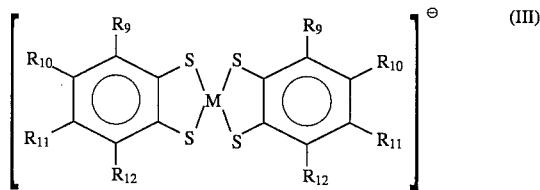

wherein $R_9$ through $R_{12}$ each indicate a hydrogen atom, a substituted or unsubstituted alkyl group, substituted or unsubstituted amino group, substituted or unsubstituted alkoxy group, or a halogen atom, and wherein M is a transition metal selected from the group consisting of Ni, Co, Mn, Cu, Pb and Pt.

7. An optical recording medium according to claim 6, wherein said metal complex anion has the following structure:

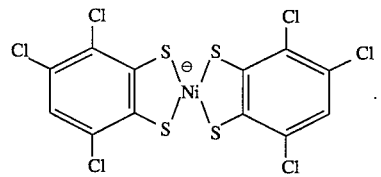

8. An optical recording medium according to claim 1, wherein said metal complex anion is expressed by the following formula (IV):

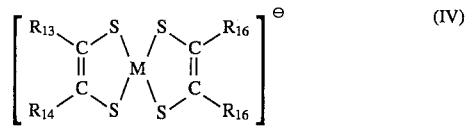

wherein $R_{13}$ through $R_{16}$ each indicate a substituted or unsubstituted alkyl group, substituted or unsubstituted aryl group, or a cyano group, and wherein M is a transition metal selected from the group consisting of Ni, Co, Mn, Cu, Pb and Pt.

9. An optical recording medium according to claim 9, wherein at least one of the substituents $R_{13}$ through $R_{16}$ of the formula (IV) is an alkoxy-substituted aryl group.

10. An optical recording medium according to claim 9, wherein said metal complex anion has the following structure:

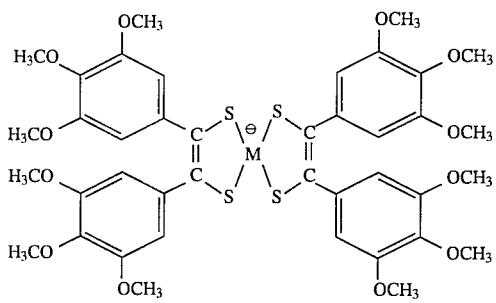

and wherein M is a transition metal selected from the group consisting of Ni, Co, Mn, Cu, Pb and Pt.

11. An optical recording medium according to claim 1, wherein said metal complex anion is expressed by the following formula (V):

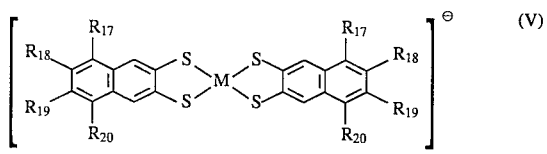

wherein $R_{17}$ through $R_{20}$ each indicate a hydrogen atom, a substituted or unsubstituted alkyl group, substituted or unsubstituted amino group, substituted or unsubstituted aryl group, substituted or unsubstituted alkoxy group, or a halogen atom, and wherein M is a transition metal selected from the group consisting of Ni, Co, Mn, Cu, Pb and Pt.

12. An optical recording medium according to claim 1, wherein said metal complex anion is expressed by the following formula (VI):

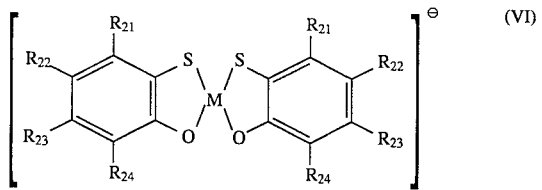

wherein $R_{21}$ through $R_{24}$ each indicate a hydrogen atom, a substituted or unsubstituted alkyl, substituted or unsubstituted amino group, substituted or unsubstituted aryl group, substituted or unsubstituted alkoxy group or a halogen atom, and wherein M is a transition metal selected from the group consisting of Ni, Co, Mn, Cu, Pb and Pt.

13. An optical recording medium according to claim 1, wherein said metal complex anion is expressed by the following formula (VII):

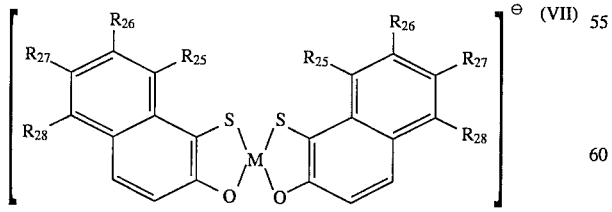

wherein $R_{25}$ through $R_{28}$ each indicate a hydrogen atom, a substituted or unsubstituted alkyl, substituted or unsubstituted amino group, substituted or unsubstituted aryl group, substituted or unsubstituted alkoxy group, or a halogen atom, and wherein M is a transition metal selected from the group consisting of Ni, Co, Mn, Cu, Pb and Pt.

14. An optical recording medium according to claim 1, wherein said metal complex anion is expressed by the following formula (VIII):

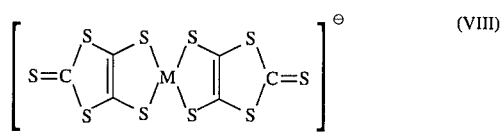

and wherein M is a transition metal selected from the group consisting of Ni, Co, Mn, Cu, Pb and Pt.

15. An optical recording medium according to claim 1, wherein said metal complex anion is expressed by the following formula (IX):

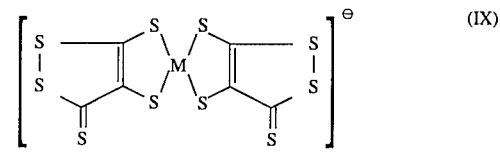

and wherein M is a transition metal selected from the group consisting of Ni, Co, Mn, Cu, Pb and Pt.

16. An optical recording medium according to claim 1, wherein said metal complex anion is a nickel complex anion.

17. An optical recording medium according to claim 1, wherein at least one of $R_1$ through $R_8$ is a substituted or unsubstituted alkoxyalkyl group.

18. An optical recording medium according to claim 1, wherein said recording layer contains a polymethine dye expressed by at least one of the following formulas (X) and (XI):

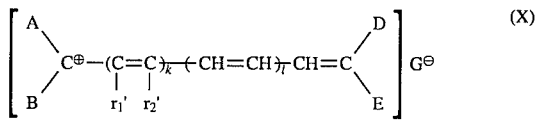

wherein A, B, D and E each indicate a hydrogen atom or a group selected from a substituted or unsubstituted alkyl group, substituted or unsubstituted alkenyl group, substituted or unsubstituted aralkyl group, substituted or unsubstituted aryl group, substituted or unsubstituted styryl group and substituted or unsubstituted heterocyclic group; $r_1'$ and $r_2'$ each indicate a hydrogen atom or a group selected from a substituted or unsubstituted alkyl group, substituted or unsubstituted cyclic alkyl group, substituted or unsubstituted alkenyl group, substituted or unsubstituted aralkyl group and substituted or unsubstituted aryl group; k is 0 or 1; l is 0, 1 or 2; and G⁻ indicates an anion;

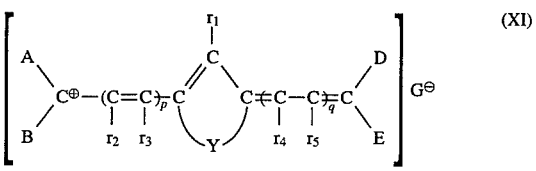

wherein A, B, D, E and G⁻ each indicate the same as that described above; $r_1$ through $r_5$ each indicate a hydrogen atom, a halogen atom, or a substituted or unsubstituted alkyl group or substituted or unsubstituted aryl group; Y indicates a divalent residue having the atoms required to complete a five-membered ring or six-membered ring; and p and q are each 0, 1 or 2.

19. An optical recording medium according to claim 1, wherein said recording layer contains at least one cyanine dye expressed by one of the following formulas (XXI), (XXII) and (XXIII):

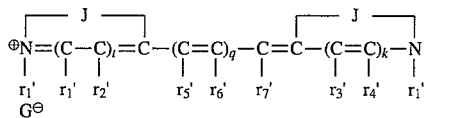 (XXI)

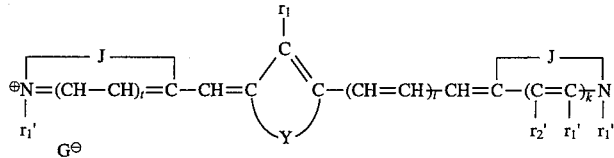 (XXII)

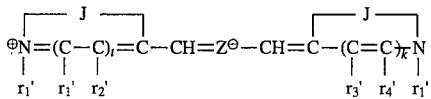 (XXIII)

wherein J indicates the atoms required to complete a nitrogen-containing heterocycle; $r_1'$ through $r_7'$ each indicate a hydrogen atom or a group selected from a substituted or unsubstituted alkyl group, a substituted or unsubstituted cyclic alkyl group, a substituted or unsubstituted alkenyl group, a substituted or unsubstituted aralkyl group and a substituted or unsubstituted aryl group; Y indicates a divalent residue having the atoms required to complete a five- or six-membered ring; k is 0 or 1; l is 0, 1 or 2; q is 0, 1 or 2; t indicates 0 or 1; G indicates an anion; and $Z^-$ indicates the following anion:

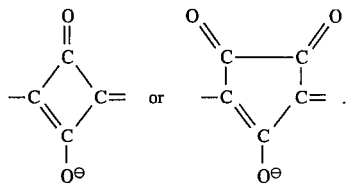

20. An optical recording medium comprising a substrate and a recording layer, wherein said recording layer contains an organic dye and a compound expressed by the following formula (II):

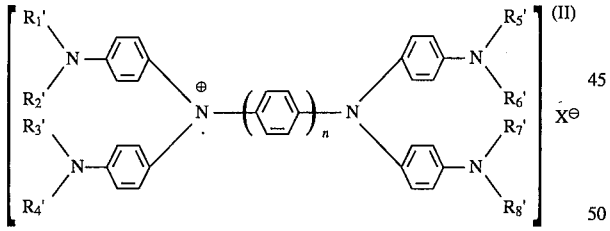 (II)

wherein $X^-$ indicates a monovalent metal complex anion; and $R_1'$ through $R_8'$ indicate atoms that, when taken together in combinations $R_m'$ and $R_{m+1}'$ (m=1, 3, 5 or 7) with a nitrogen atom N, at least one of such combinations forms a substituted or unsubstituted five-membered ring, substituted or unsubstituted six-membered or substituted or unsubstituted seven-membered ring; and n is 1 or 2.

21. An optical recording medium according to claim 20, wherein said five-membered ring is a pyrrolidine ring.

22. An optical recording medium according to claim 20, wherein said six-membered ring is a piperidine, morpholine or tetrahydropyridine ring.

23. An optical recording medium according to claim 20, wherein said seven-membered ring is a cyclohexylamine ring.

24. An optical recording medium according to claim 20, wherein at least two of the combinations of the organic residues $R_1$ and $R_2$, $R_3$ and $R_4$, $R_5$ and $R_6$, and $R_7$ to $R_8$ form a substituted or unsubstituted five-membered ring, substituted or unsubstituted six-membered ring or substituted or unsubstituted seven-membered ring.

25. An optical recording medium according to claim 20, wherein said metal complex anion is expressed by the following formula (III):

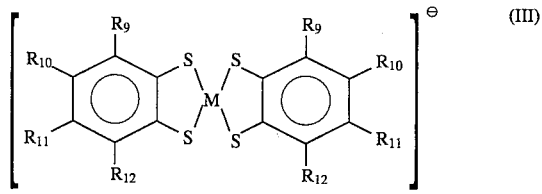 (III)

wherein $R_9$ through $R_{12}$ each indicate a hydrogen atom, a substituted or unsubstituted alkyl group, substituted or unsubstituted amino group, substituted or unsubstituted alkoxy group, or a halogen atom, and wherein M is a transition metal selected from the group consisting of Ni, Co, Mn, Cu, Pb and Pt.

26. An optical recording medium according to claim 20, wherein said metal complex anion has the following structure:

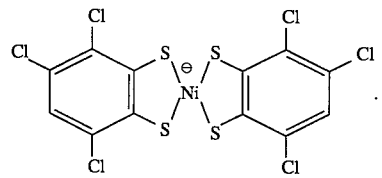

27. An optical recording medium according to claim 20, wherein said metal complex anion is expressed by the following formula (IV):

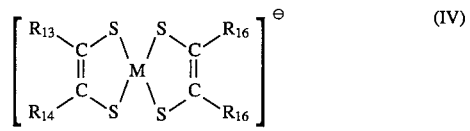 (IV)

wherein $R_{13}$ through $R_{16}$ each indicate a substituted or unsubstituted alkyl, substituted or unsubstituted aryl group, or a cyano group, and wherein M is a transition metal selected from the group consisting of Ni, Co, Mn, Cu, Pb and Pt.

28. An optical recording medium according to claim 27, wherein at least one of the substituents $R_{13}$ through $R_{16}$ of the formula (IV) is an alkoxy-substituted aryl group.

29. An optical recording medium according to claim 28, wherein said metal complex anion has the following structure:

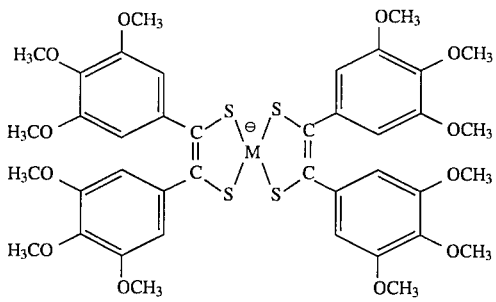

and wherein M is a transition metal selected from the group consisting of Ni, Co, Mn, Cu, Pb and Pt.

30. An optical recording medium according to claim 20, wherein said metal complex anion is expressed by the following formula (V):

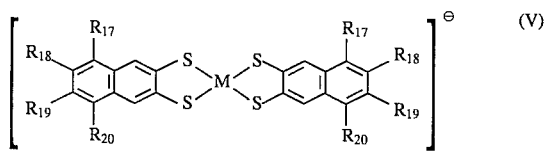

wherein $R_{17}$ through $R_{20}$ each indicate a hydrogen atom, a substituted or unsubstituted alkyl group, substituted or unsubstituted amino group, substituted or unsubstituted aryl group, substituted or unsubstituted alkoxy group, or a halogen atom, and wherein M is a transition metal selected from the group consisting of Ni, Co, Mn, Cu, Pb and Pt.

31. An optical recording medium according to claim 20, wherein said metal complex anion is expressed by the following formula (VI):

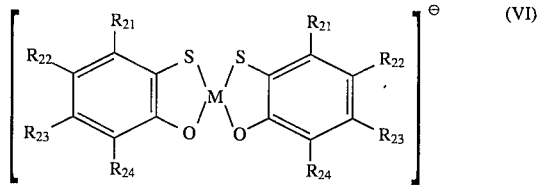

wherein $R_{21}$ through $R_{24}$ each indicate a hydrogen atom, a substituted or unsubstituted alkyl group, substituted or unsubstituted amino group, substituted or unsubstituted aryl group, substituted or unsubstituted alkoxy group, or a halogen atom, and wherein M is a transition metal selected from the group consisting of Ni, Co, Mn, Cu, Pb and Pt.

32. An optical recording medium according to claim 20, wherein said metal complex anion is expressed by the following formula (VII):

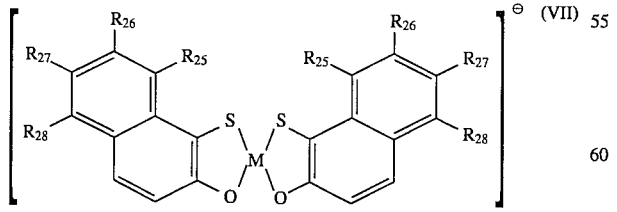

wherein $R_{25}$ through $R_{28}$ each indicate a hydrogen atom, a substituted or unsubstituted alkyl group, substituted or unsubstituted amino group, substituted or unsubstituted aryl group, substituted alkoxy group, or a halogen atom, and wherein M is a transition metal selected from the group consisting of Ni, Co, Mn, Cu, Pb and Pt.

33. An optical recording medium according to claim 20, wherein said metal complex anion is expressed by the following formula (VIII):

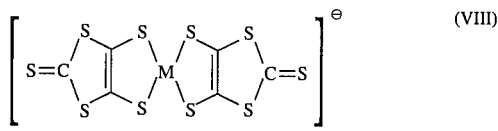

and wherein M is a transition metal selected from the group consisting of Ni, Co, Mn, Cu, Pb and Pt.

34. An optical recording medium according to claim 20, wherein said metal complex anion is expressed by the following formula (IX):

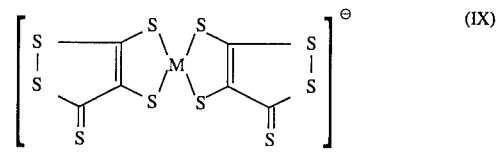

and wherein M is a transition metal selected from the group consisting of Ni, Co, Mn, Cu, Pb and Pt.

35. An optical recording medium according to claim 20, wherein said metal complex anion is a nickel complex anion.

36. An optical recording medium according to claim 20, wherein at least one of the combinations $R_1'$ and $R_2'$, $R_3'$ and $R_4'$, $R_5'$ and $R_6'$, and $R_7'$ and $R_8'$ forms a morpholine ring.

37. An optical recording medium according to claim 20, wherein said recording layer contains a polymethine dye expressed by one of the following formulas (X) and (XI):

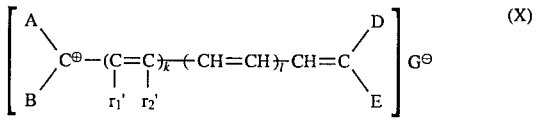

wherein A, B, D and E each indicate a hydrogen atom or a group selected from a substituted or unsubstituted alkyl group, substituted or unsubstituted alkenyl group, substituted or unsubstituted aralkyl group, substituted or unsubstituted aryl group, substituted or unsubstituted styryl group and substituted or unsubstituted heterocyclic group; $r_1'$ and $r_2'$ each indicate a hydrogen atom or a group selected from a substituted or unsubstituted alkyl group, substituted or unsubstituted cyclic alkyl group, substituted or unsubstituted alkenyl group, substituted or unsubstituted aralkyl group and substituted or unsubstituted aryl group; k is 0 or 1; l indicates 0, 1 or 2; and $G^-$ indicates an anion; and

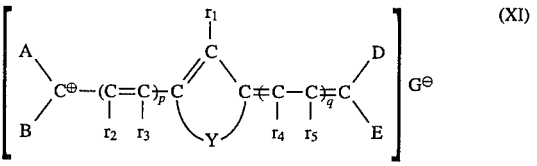

wherein A, B, D, E and $G^-$ each indicate the same as that described above; $r_1$ through $r_5$ each indicate a hydrogen atom, a halogen atom, or a substituted or unsubstituted alkyl group or a substituted or unsubstituted aryl group; Y indicates a divalent residue having the atoms required to complete a five- or six-membered ring; and p and q are each 0, 1 or 2.

38. An optical recording medium according to claim 20, wherein said recording layer contains at least one of cyanine dyes expressed by one of the following formulas (XXI), (XXII) and (XXIII):

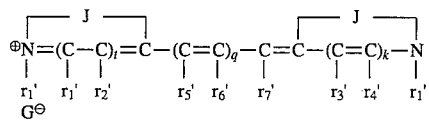
(XXI)

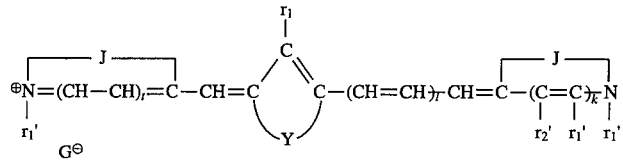
(XXII)

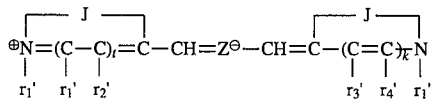
(XXIII)

wherein J indicates the atoms required to complete a nitrogen-containing heterocycle; $r_1'$ through $r_7'$ each indicate a hydrogen atom or a group selected from a substituted or unsubstituted alkyl group, substituted or unsubstituted cyclic alkyl group, substituted or unsubstituted alkenyl group, substituted or unsubstituted aralkyl group and substituted or unsubstituted aryl group; Y indicates a divalent residue having the atoms required to complete a five- or six-membered ring; k is 0 or 1; l is 0, 1 or 2; q is 0, 1 or 2; t is 0 or 1; G indicates an anion; and $Z^-$ indicates the following anion:

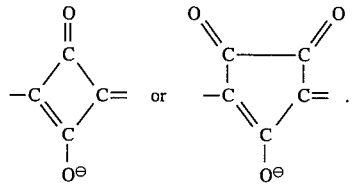

* * * * *

UNITED STATES PATENT AND TRADEMARK OFFICE
CERTIFICATE OF CORRECTION

PATENT NO. : 5,605,732      Page 1 of 2
DATED : February 25, 1997
INVENTOR(S) : CHIEKO MIHARA, ET AL.

It is certified that error appears in the above-indentified patent and that said Letters Patent is hereby corrected as shown below:

COLUMN 4

Line 14, "ethoxypentyl, "should read --4-ethoxypentyl,--.

COLUMN 13

Formula VIII, "$\underset{\overset{\|}{O}}{\vee}$" should read --$\underset{\overset{\|}{S}}{\vee}$-- (both occurrences)

COLUMN 16

Table 2-5, "N" should read --H--.

COLUMN 22

Formula (1), "$Z^{\oplus}=$" should read --$Q^{\oplus}=$--.

COLUMN 33

Line 17, "be low." should read --below--.

COLUMN 42

Line 46, "att" should read --at--.

UNITED STATES PATENT AND TRADEMARK OFFICE
CERTIFICATE OF CORRECTION

PATENT NO. : 5,605,732
DATED : February 25, 1997
INVENTOR(S) : CHIEKO MIHARA, ET AL.

It is certified that error appears in the above-indentified patent and that said Letters Patent is hereby corrected as shown below:

COLUMN 50

Line 65, "claim 9," should read --claim 8,--.

Column 54

Line 55, "$R_{16}$" should read --$R_{15}$--.

Signed and Sealed this

Fifth Day of May, 1998

*Attest:*

BRUCE LEHMAN

*Attesting Officer*   *Commissioner of Patents and Trademarks*